(12) United States Patent
Todoroki

(10) Patent No.: US 12,185,191 B2
(45) Date of Patent: Dec. 31, 2024

(54) APPLICATION PROGRAM AND BEHAVIOR MANAGEMENT DEVICE

(71) Applicant: TRYTODOU CORPORATION, Souka (JP)

(72) Inventor: Wataru Todoroki, Souka (JP)

(73) Assignee: TRYTODOU CORPORATION, Souka (JP)

( * ) Notice: Subject to any disclaimer, the term of this patent is extended or adjusted under 35 U.S.C. 154(b) by 522 days.

(21) Appl. No.: 17/620,695

(22) PCT Filed: Sep. 18, 2020

(86) PCT No.: PCT/JP2020/037044
§ 371 (c)(1),
(2) Date: Dec. 18, 2021

(87) PCT Pub. No.: WO2021/060565
PCT Pub. Date: Apr. 1, 2021

(65) Prior Publication Data
US 2022/0264252 A1    Aug. 18, 2022

(30) Foreign Application Priority Data

Sep. 24, 2019  (JP) ................................. 2019-187156

(51) Int. Cl.
*H04W 4/02*    (2018.01)
*G01S 13/42*   (2006.01)
(Continued)

(52) U.S. Cl.
CPC ............. *H04W 4/029* (2018.02); *G01S 13/42* (2013.01); *G06V 20/52* (2022.01); *G10L 15/22* (2013.01);
(Continued)

(58) Field of Classification Search
CPC ..... G01G 13/06; G01S 13/42; G01S 2205/09; G06Q 50/10; G06V 20/52; G10L 15/22;
(Continued)

(56) References Cited

U.S. PATENT DOCUMENTS

| | | |
|---|---|---|
| 2008/0030580 A1 | 2/2008 | Kashiwa |
| 2013/0176161 A1 | 7/2013 | Derham et al. |
| 2016/0337810 A1* | 11/2016 | Nakagawa ............. H04W 4/30 |

FOREIGN PATENT DOCUMENTS

| | | |
|---|---|---|
| JP | 2006-121428 A | 5/2006 |
| JP | 2007-221328 A | 8/2007 |

(Continued)

OTHER PUBLICATIONS

International Search Report dated Oct. 27, 2020, issued in the counterpart International Application No. PCT/JP2020/037044 and English translation thereof.

(Continued)

*Primary Examiner* — Nader Bolourchi
(74) *Attorney, Agent, or Firm* — Muncy, Geissler, Olds & Lowe, P.C.

(57) ABSTRACT

Provided are an application program and a behavior management device that enable behavior management using a wireless communication technology included in a portable device and that can be helpful for solving various problems. A server SV is provided with: a time information input means for receiving input of time information; and a mapping means for reading, from a database of the server SV, device information corresponding to the time information, the input of which has been received by the time information input means, and relative positional relation information corresponding to the device information, and for performing (Continued)

mapping to arrange users on a virtual map on the basis of the relative positional relation information corresponding to the read device information.

12 Claims, 12 Drawing Sheets

(51) Int. Cl.
*G06V 20/52* (2022.01)
*G10L 15/22* (2006.01)
*G10L 15/30* (2013.01)
*H04M 1/02* (2006.01)
*H04W 4/029* (2018.01)

(52) U.S. Cl.
CPC ........... *G10L 15/30* (2013.01); *H04M 1/0264* (2013.01); *H04M 2250/74* (2013.01)

(58) Field of Classification Search
CPC .............. G10L 15/30; G10L 2015/088; H04M 1/0264; H04M 2250/74; H04W 4/023; H04W 4/029
See application file for complete search history.

(56) References Cited

FOREIGN PATENT DOCUMENTS

| JP | 2008-204220 A | 9/2008 |
|---|---|---|
| JP | 2011-166263 A | 8/2011 |
| JP | 2013-539854 A | 10/2013 |
| JP | 2015-177488 A | 10/2015 |
| JP | 2019-015643 A | 1/2019 |

OTHER PUBLICATIONS

Written Opinion of the International Searching Authority dated Oct. 27, 2020, issued in the counterpart International Application No. PCT/JP2020/037044.

Office Action dated Oct. 9, 2020 issued in the counterpart Japanese Patent Application No. 2020-153395, with English translation thereof.

\* cited by examiner

APPLICATION PROGRAM AND BEHAVIOR MANAGEMENT DEVICE

TECHNICAL FIELD

The present invention relates to an application program and a behavior management device.

BACKGROUND ART

In recent years, crimes have become more sophisticated and malicious. Therefore, in Japan, for example, security cameras are installed in many places in the city, and when an incident occurs, the criminal is identified by analyzing the images of the security cameras, thus making it easier to track the criminal. For this reason, the effect of crime deterrence is also high.

However, the places where security cameras are installed are limited, and therefore when an incident such as assault occurs in a place where a security camera is not installed or in a place inside a blind spot of a security camera, it may not be possible to understand the circumstances of the incident since there is no video record left.

Meanwhile, the performance of mobile devices such as smartphones is improving, and it is possible to determine the distance to the device of another party by using wireless communication technology such as Bluetooth (registered trademark) Low Energy (BLE).

CITATION LIST

Patent Document

Patent Document 1: JP 2019-015643 A

SUMMARY OF THE INVENTION

Technical Problem

In the future, it is expected that behavior management will be realized by utilizing the wireless communication technology described above.

The present invention has been made in view of the above problems, and aims to provide an application program and a behavior management device capable of enabling behavior management using wireless communication technology possessed by a mobile device and useful for solving various problems.

Solution to Problem

In order to solve the above objective, the invention according to claim 1 relates to an application program characterized in that the application program causes a mobile device comprising: a storage means including a received information storage area for storing received information; a wireless communication means capable of communicating wirelessly via radio waves; and a radio wave processing means for performing signalization processing of received radio waves, execution of: reception processing for receiving, by the wireless communication means, radio waves transmitted from another mobile device that has approached within a predetermined distance; device information storage processing for storing, in the received information storage area, device information about the another mobile device received in the reception processing together with time information; radio wave intensity detection processing for detecting at least an intensity of the radio waves based on radio wave signals obtained by signalizing, by the radio wave processing means, the radio waves transmitted from the another mobile device; positional relationship storage processing for identifying a relative positional relationship with the other mobile device based on the intensity of the radio waves detected by the radio wave intensity detection processing and for storing the relative positional relationship in the received information storage area; and information transmission processing for transmitting, to a management server, the device information about the another mobile device, the time information, and the relative positional relationship information stored in the received information storage area.

The invention according to claim 2 relates to an application program characterized in that the application program causes a mobile device comprising: a storage means including a received information storage area for storing received information; a wireless communication means capable of communicating wirelessly via radio waves; and a radio wave processing means for performing signalization processing of received radio waves, execution of: reception processing for receiving, by the wireless communication means, radio waves transmitted from an executing mobile device and reflected by an object that has approached within a predetermined distance; object information storage processing for storing, in the received information storage area, reflection information from an object received in the reception processing together with time information; reflected wave intensity detection processing for detecting at least an intensity of reflected waves based on radio wave signals obtained by converting, by the radio wave processing means, the reflected waves of the radio waves transmitted from the executing mobile device into signals; positional relationship storage processing for identifying a relative positional relationship with the object based on the intensity of reflected waves detected by the reflected wave intensity detection processing and storing the relative positional relationship in the received information storage area; and information transmission processing for transmitting, to a management server, the reflection information, the time information, and the relative positional relationship information about the object stored in the received information storage area.

The invention according to claim 3 relates to the application program according to claim 1 or 2, characterized in that the mobile device further comprises a voice acquisition unit capable of acquiring a voice from an external source, the application program causes execution of: voice determination processing for determining, based on the voice acquired by the voice acquisition unit, whether or not a specific pattern of voice has been input; and particular voice pattern information generation processing for generating particular voice pattern information indicating that the specific pattern of voice has been input if it is determined that the specific pattern of voice has been input in the voice determination processing, and wherein the particular voice pattern information can be transmitted to the management server during the information transmission processing.

The invention according to claim 4 relates to the application program according to any one of claims 1 to 3, characterized in that the mobile device further comprises an imaging unit capable of capturing an image, and the application program causes execution of: person determination processing for determining, based on the image acquired by the imaging unit, whether or not a particular person is included in the image; and particular person information generation processing for generating, if it is determined that a particular person is included in the image acquired in the person determination processing, particular person information indicating inclusion of the particular person, and wherein the particular person information can be transmitted to the management server during the information transmission processing.

The invention according to claim 5 relates to a behavior management device for managing behavior of a user of a mobile device by using information that is transmitted from the mobile device on which the application program according to claim 1 is installed and that is stored in a management server, the behavior management device comprising: a time information input means for accepting input of time information; and a mapping means for reading, from the management server, device information corresponding to the time information for which input was accepted by the time information input means and the relative positional relationship information corresponding to the device information, and mapping the user on a virtual map based on the device information and the relative positional relationship information thus read.

The invention according to claim 6 relates to a behavior management device for managing behavior of a user of a mobile device by using information that is transmitted from the mobile device on which the application program according to claim 2 is installed and that is stored in a management server, the behavior management device comprising: a time information input means for accepting input of time information; and a mapping means for reading, from the management server, device information corresponding to the time information for which input was accepted by the time information input means, reflection information from an object, and relative positional relationship information corresponding to the reflection information, and mapping the user and the object on a virtual map based on the reflection information and the relative positional relationship information thus read.

The invention according to claim 7 relates to a behavior management device for managing behavior of a user of a mobile device by using information that is transmitted from the mobile device on which the application program according to claim 3 is installed and that is stored in a management server, the behavior management device comprising: a time information input means for accepting input of time information; a mapping means for reading, from the management server, device information corresponding to time information for which input was accepted by the time information input means and the relative positional relationship information corresponding to the device information, and mapping the user on a virtual map based on the device information and the relative positional relationship information thus read; and a particular information transmission means for transmitting, when the particular voice pattern information is included in information received from the mobile device, particular information to the mobile device corresponding to the device information associated in advance with the device information corresponding to the mobile device.

The invention according to claim 8 relates to a behavior management device for managing behavior of a user of a mobile device by using information that is transmitted from the mobile device on which the application program according to claim 4 is installed and that is stored in a management server, the behavior management device comprising: a time information input means for accepting input of time information; a mapping means for reading, from the management server, device information corresponding to time information for which input was accepted by the time information input means and the relative positional relationship information corresponding to the device information, and mapping the user on a virtual map based on the device information and the relative positional relationship information thus read; and a particular information transmission means for transmitting, when the particular person information is included in the information received from the mobile device, particular information to the mobile device corresponding to the device information associated in advance with the device information corresponding to the mobile device.

The invention according to claim 9 relates to the behavior management device according to any one of claims 5 to 8, characterized in that the mapping means can carry out the mapping in time series.

Advantageous Effects of Invention

According to the present invention, it is possible to enable behavior management using the wireless communication technology possessed by a mobile device and to solve various problems.

DESCRIPTION OF EMBODIMENTS

Figure 1:
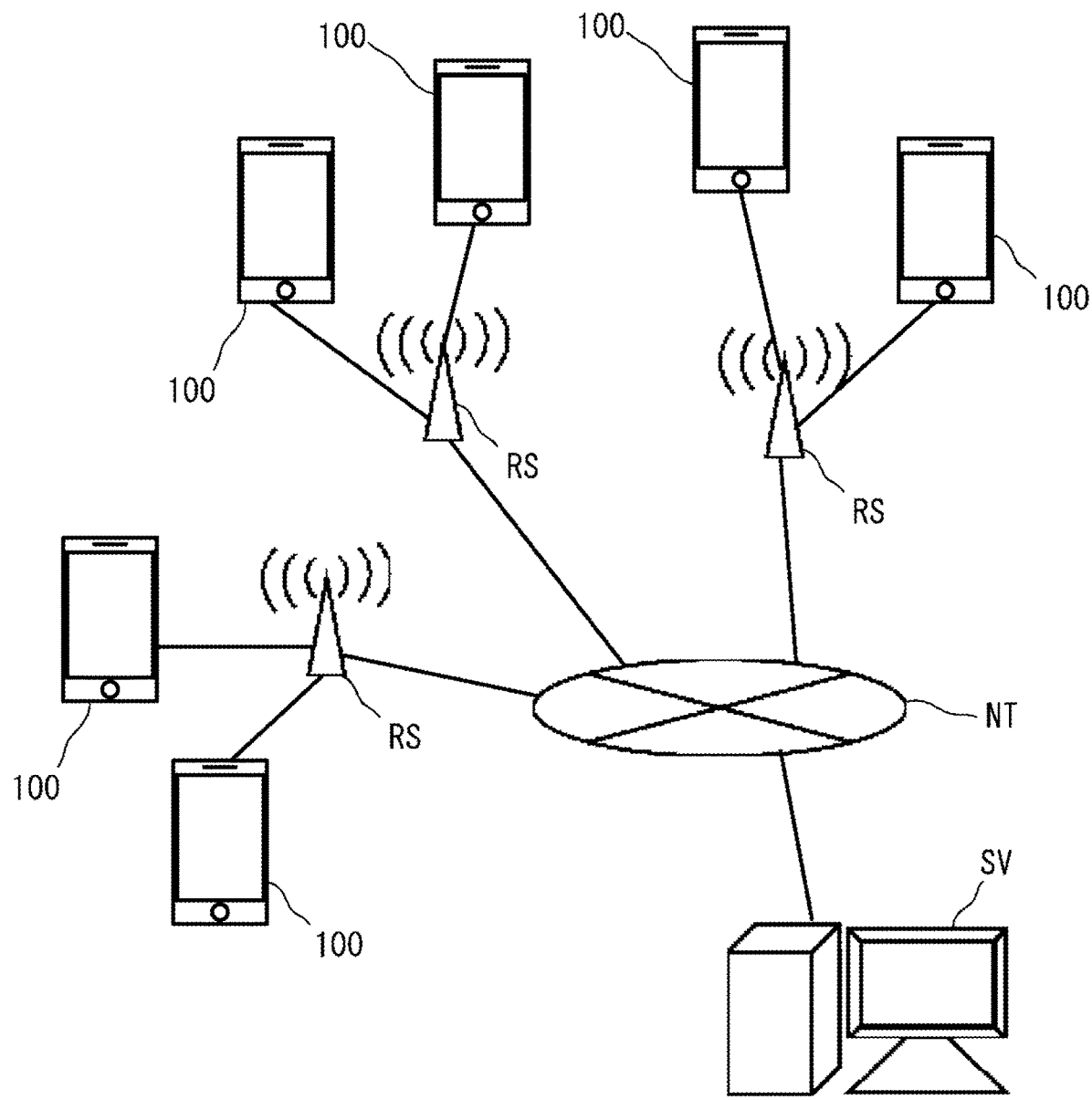
FIG. 1 is a diagram showing an example of a behavior management network according to the present embodiments.

Hereinafter, the behavior management system according to the embodiments of the present invention will be described with reference to the drawings. However, the scope of the invention should not be limited to the illustrated examples. In the following description, those elements having the same function and configuration are designated by the same reference numerals, and the description thereof will be omitted.

First Embodiment

First, a behavior management system according to the present embodiments will be described with reference to FIG. 1.

Here, FIG. 1 is a diagram showing an example of a behavior management network according to the present embodiments.

As shown in FIG. 1, information transmitted from a mobile device (for example, a smartphone) 100 possessed by an owner of the device is communicated via a network NT (the Internet) through, for example, relay base stations RS installed by mobile carrier companies. The relay base stations RS may be shared by multiple mobile carrier companies.

In the present embodiment, a server SV is connected to the network NT. The server SV may be in any form, but in the present embodiment, a so-called cloud server is connected.

The present embodiment is configured as described above, and the mobile device 100 owned by the device owner and the server SV are configured so as to be able to be connected to each other through the network NT.

Next, the functional configuration of the mobile device 100, which is an example of a mobile device possessed by the user and is compatible with the present embodiment, will be described with reference to FIG. 2. Here, FIG. 2 is a functional block diagram of a mobile device.

Figure 2:
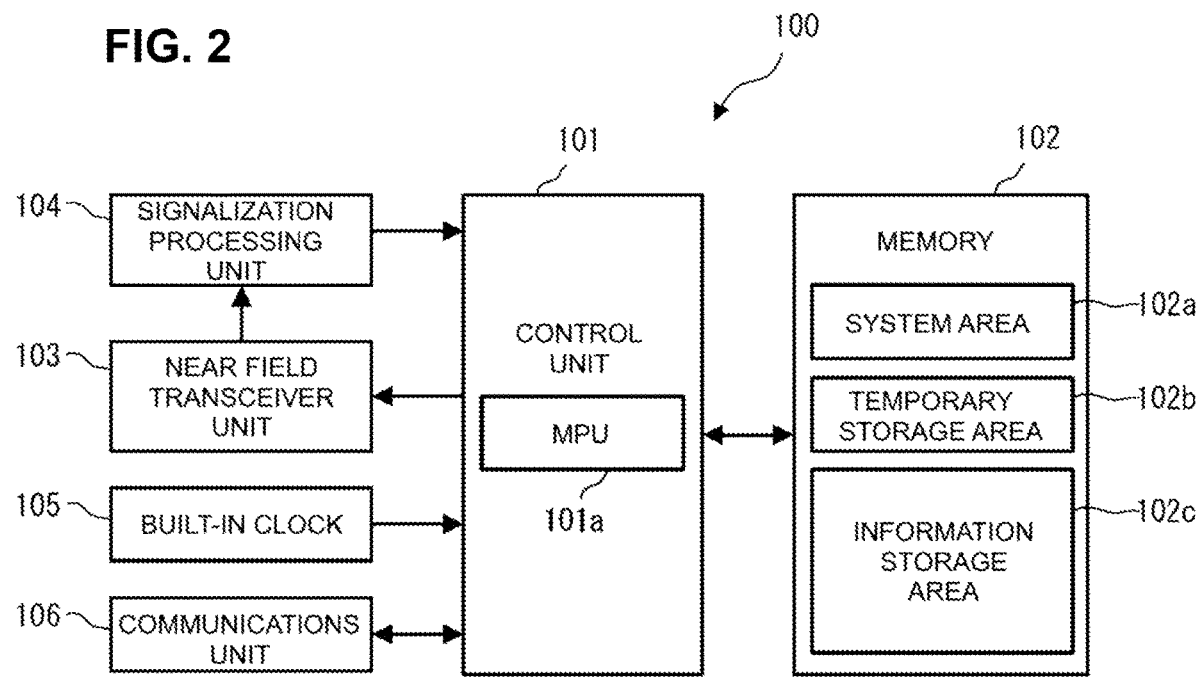
FIG. 2 is a functional block diagram of a mobile device.

As shown in FIG. 2, for example, the mobile device 100 includes: a control unit 101 for performing overall control of the mobile device 100; a memory 102 for storing various data and programs; a near field transceiver unit 103 capable of performing near field communication with other mobile devices or the like; a signalization processing unit 104 for converting a carrier wave such as a radio wave received by the near field transceiver unit 103 into signals; a built-in clock 105 for generating the current time based on information from, for example, GPS (Global Positioning System) or a beacon; and a communications unit 106 for transmitting and receiving information to and from a nearby relay base station RS.

The control unit 101 includes a Micro Processor Unit (MPU) 101a, and performs overall control of the mobile device 100 by, for example, reading a program stored in a system area 102a in the memory 102 and utilizing information stored in a temporary storage area 102b.

The memory 102 is composed of, for example, non-volatile memories, and is divided into a plurality of areas. In the present embodiment, for example, the memory 102 includes the system area 102a, the temporary storage area 102b, and the information storage area 102c, but storage areas having other functions may also be included, or a plurality of functions may be executed to function with the same storage area.

For example, programs for operating the system of the mobile device 100 and various applications installed on the mobile device 100 are stored in the system area 102a, and the system area 102a is read and executed by the MPU 101a of the control unit 101 as appropriate.

For example, the temporary storage area 102b can be used as a work area and can temporarily store information obtained by communication.

As will be described in detail later, for example, device information about the mobile device 100 of interest (e.g. device-characteristic information set for each device or the like), contact information with other mobile devices 100, or the like are stored in the information storage area 102c.

The near field transceiver unit 103 is a device for performing near field communication such as Bluetooth (registered trademark), and transmits and receives information to and from other mobile devices 100 or devices that conform to this wireless communication standard. Thus, in the present embodiment, the near field transceiver unit 103 functions as a communication means. Moreover, in the present embodiment, it can be said that the control unit 101 executes transmission and reception processing for transmitting and receiving device-characteristic information to and from other mobile devices 100 by controlling the near field transceiver unit 103.

The signalization processing unit 104, for example, converts the radio waves received by the near field transceiver unit 103 into signals, performs A/D conversion, and transmits the result to the control unit 101. The control unit 101 can analyze the data transmitted from the signalization processing unit 104 by, for example, a predetermined application program, and detect information contained in the radio waves, the intensity of the radio waves, distortion in the radio waves, or the like. Thus, in the present embodiment, the signalization processing unit 104 functions as a radio wave processing means.

The built-in clock 105 outputs the time information thus generated to the control unit 101 as appropriate. Moreover, the communications unit 106 searches for a nearby relay base station RS and transmits and receives data as appropriate.

Next, a configuration of the information storage area 102c in the memory 102 will be described with reference to FIG. 3.

Figure 3:
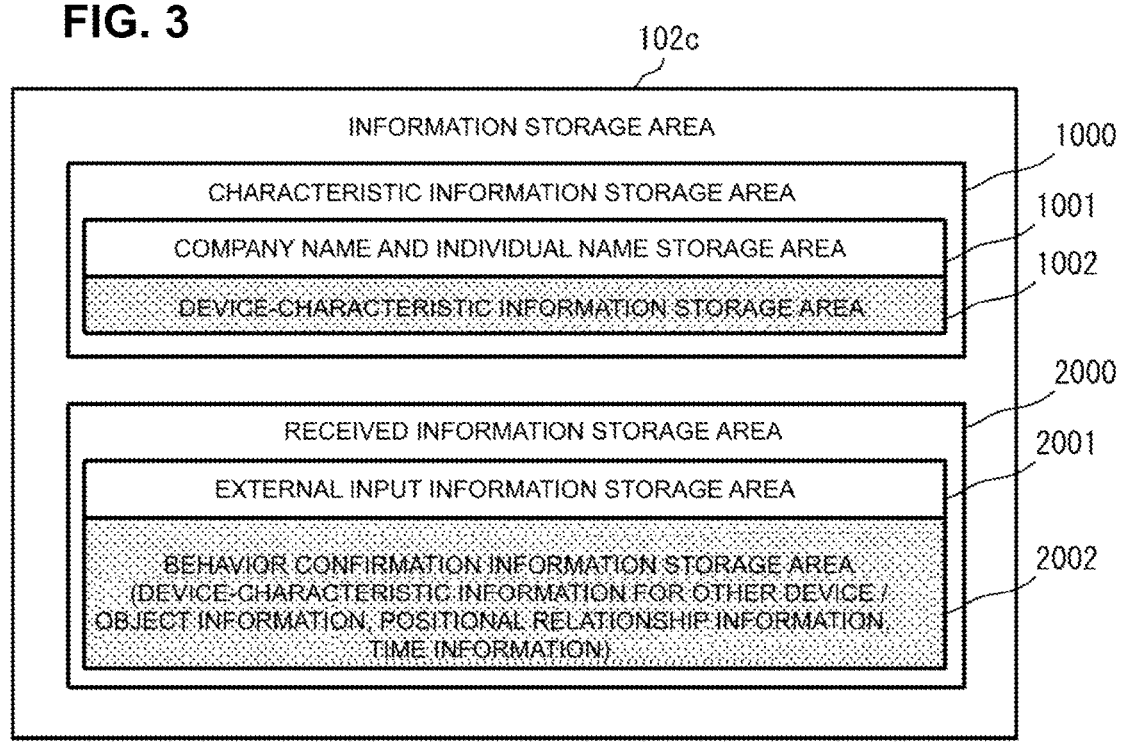
FIG. 3 is a diagram for explaining a configuration of an information storage area.

As shown in FIG. 3, the information storage area 102c is configured to include a characteristic information storage area 1000 and a received information storage area 2000. A storage area having functions other than those of the characteristic information storage area 1000 and the received information storage area 2000 may also be included.

The characteristic information storage area 1000 includes a corporate name/personal name storage area 1001 and a device-characteristic information storage area 1002, and the received information storage area 2000 includes an external input information storage area 2001 and a behavior confirmation information storage area 2002. The storage areas included in the characteristic information storage area 1000 and the received information storage area 2000 are not limited to those described above, and storage areas having other functions may also be included.

The corporate name/personal name storage area 1001 is a storage area in which information about corporations and/or individuals who own or manage the mobile device 100 can be read and written discretionarily. Biometric authentication information (e.g. face authentication information, fingerprint authentication information), a personal identification number, SIM information, or the like may also be stored as personally identifiable information. For example, the identity of another nearby user can be recognized by the mobile device 100 of interest based on the personal information stored in the corporate name/personal name storage area 1001. By using this function, for example, a user who is at home can know the identity of another user who visits their home (e.g. an acquaintance, a courier) in advance, which can be useful for crime prevention.

The device-characteristic information storage area 1002 stores personal information of the user and is a storage area that cannot be accessed by the user. For example, highly confidential personal information, such as the telephone number of the mobile device 100, the user's address, and a user ID, is stored as information stored in the device-characteristic information storage area 1002. In the present embodiment, the information stored in the device-characteristic information storage area 1002 is stored after being encrypted in order to make it difficult to identify the information, but such information need not be encrypted. In addition, information indicating arrival to a predetermined position, information about the cause of an abnormality in a case where an abnormality has occurred in the mobile device 100, or the like may be encrypted and stored in the device-characteristic information storage area 1002.

The external input information storage area 2001 is an area for temporarily storing device-characteristic information of other devices received through the near field transceiver unit 103 or information (object information) related to an object identified by the control unit 101 (e.g. a person who does not possess a mobile device 100). The behavior confirmation information storage area 2002 is an area for storing information, such as device-characteristic information for other devices and object information, stored in the external input information storage area 2001, along with time information indicating the acquired time of the information and relative positional information obtained by analyzing with the control unit 101 relative to the mobile device of interest. The behavior confirmation information storage area 2002 is a storage area that cannot be accessed by the user, and the information stored in the behavior confirmation information storage area 2002 is transmitted to a nearby relay base station RS at an appropriate timing and is transmitted to a server SV via the network NT.

Figure 4:
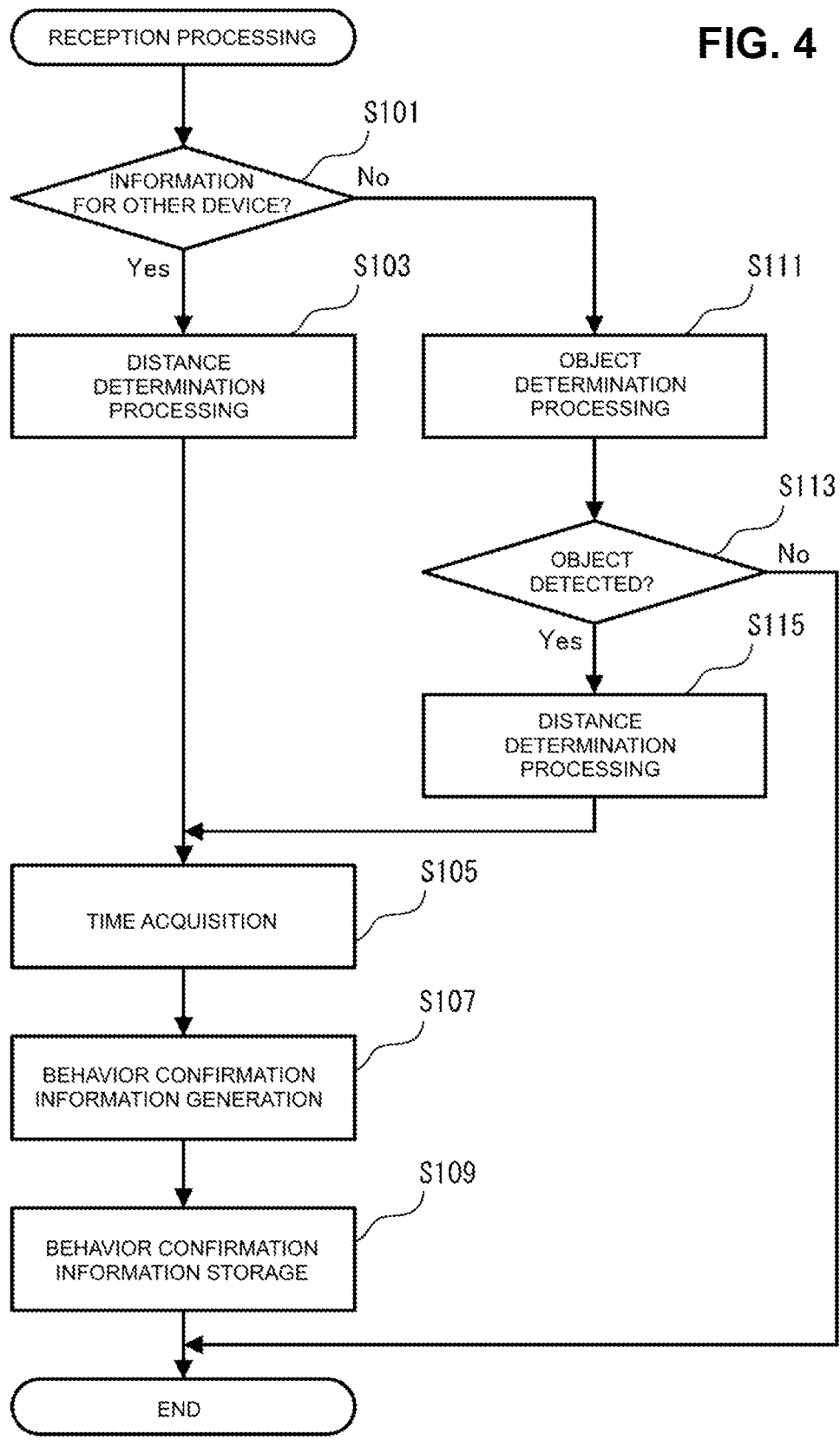
FIG. 4 is a flowchart for explaining reception processing executed in a mobile device on which the application program according to the present embodiments is installed.

Next, reception processing executed in the mobile device 100 configured as described above will be described with reference to FIG. 4. Here, FIG. 4 is a flowchart for explaining reception processing executed in a mobile device on which the application program according to the present embodiments is installed. This application program can be installed by downloading it from a predetermined application store or the like but may be pre-installed on the mobile device 100 in advance.

First, the near field transceiver unit 103 receives information and the information is temporarily stored in the external input information storage area 2001 in the information storage area 102c in the memory 102. The MPU 101a in the control unit 101 reads the received information stored in the external input information storage area 2001 and determines whether or not the received information thus read is information (other device information) indicating other mobile device 100 (step S101). When the MPU 101a determines that the information is of other device (step S101; Yes), the MPU 101a executes distance determination processing (step S103). Specifically, as described above, the MPU 101a analyzes the waveform of the radio waves that are received by the near field transceiver unit 103 and converted to a signal by the signalization processing unit 104, and determines the distance and direction with respect to the other mobile device 100. More specifically, the distance can be calculated from the intensity of the radio waves and the reception direction can be detected from the waveform. Thus, the distance and the direction of the other device can be determined. For example, in addition to the information about the other mobile device 100, information about a beacon that is transmitted from a wireless station installed in the city may be processed as the information about the other device.

Thereafter, the MPU 101a acquires the current time from the built-in clock 105 (step S105). Thereafter, the MPU 101a generates and encrypts the device-characteristic information for the other mobile device, the distance and direction to the mobile device of interest, and the behavior confirmation information including the acquired current time (step S107), and then stores them in the behavior confirmation information storage area in the information storage area 102c in the memory 102 (step S109). Then, the reception processing ends.

When the MPU 101a does not determine that the information is of other device in step S101 (that is, when the radio waves are reflected waves of radio waves output from the mobile device 100 of interest) (step S101; No), object determination processing is executed (step S111). Specifically, as described above, the MPU 101a analyzes the waveform of the radio waves that is received by the near field transceiver unit 103 and is converted to a signal by the signalization processing unit 104. Then, for example, when the reflected waves of the radio waves output from the mobile device 100 of interest contains distortion, the MPU 101a detects the presence and absence, the size, the movement, or the like of the object presuming that the information for the reflected waves is information for reflected waves that are reflected by an object that has approached within a predetermined distance. For example, it is possible to identify a person who is on the other side of a wall by, for example, generating textbook data using the analysis result of radio wave distortion and performing AI analysis on the analysis result of radio wave distortion.

As a result of analyzing the received reflected wave, the MPU 101a determines whether or not the presence of a nearby object is detected (step S113). When the MPU 101a determines that the object is detected (step S113; Yes), the MPU 101a executes the distance determination processing (step S115). Specifically, as described above, the MPU 101a analyzes the waveform of the reflected waves that are received by the near field transceiver unit 103 and converted to a signal by the signalization processing unit 104, and determines the distance and direction between the mobile device of interest and the object. More specifically, the distance can be calculated from the intensity of the radio waves and the reception direction can be detected from the waveform. Thus, the distance and the direction of the object can be determined. It is also possible to determine the size and shape from the waveform and determine the movement from the change in intensity of radio waves and the reception direction. Thereafter, the processes of steps S105 to S109 are executed to end the reception processing. Meanwhile, when the MPU 101a does not detect an object as a result of analyzing the received reflected wave (step S113; No), the reception processing ends.

The behavior confirmation information thus generated is read from the behavior confirmation information storage area 2002 as appropriate and is stored in the large-capacity storage device in the server SV via the network NT on a user-by-user basis.

In a crowded city or a transportation system, there are cases where the processing speed cannot keep up with the amount of information that is transmitted and received during a certain time period. The range in which transmission and reception can be performed with the other mobile device 100 can therefore be configured variably, for example.

Figure 5:
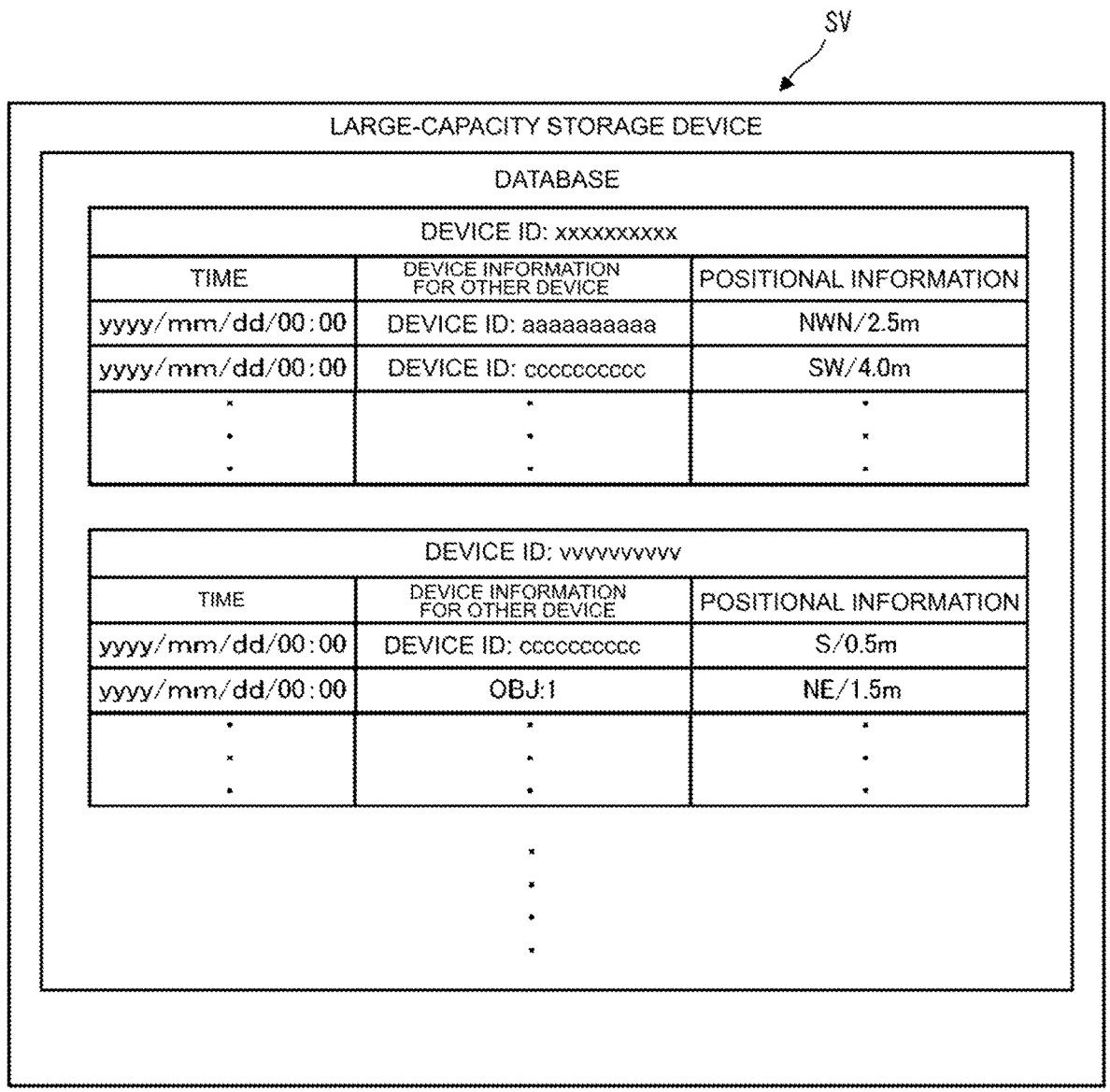
FIG. 5 is a diagram for explaining a configuration of a database formed in a large-capacity storage device in a server.

Here, the configuration of the database formed in the large-capacity storage device in the server SV will be described with reference to FIG. 5.

The server SV is provided with a large-capacity storage device, and a database is formed in this large-capacity storage device. In the database, a data field is formed for each device ID, which indicates the device-characteristic information of the mobile device 100. The device ID for the mobile device 100 is read from information received from the mobile device 100 via the network NT to store the received information into a corresponding data field. The server SV may be owned by a particular person, may be owned by the authorities, or may be owned by a particular person but placed under the control of the authorities.

Specifically, the time information included in the received information, the device information for other device (device ID for other device), and the positional information indicating the relative positional relationship with the device of interest are stored by being associated among themselves. Object information (e.g. presence and absence of an object based on reflection information from the object, relative positional relationship with the object, or size, shape or movement of the object) may be stored in the field of device information for other device instead of the device ID for other device.

When the user or administrator of the mobile device 100 is changed, connection information such as an account is changed, the biometric authentication configuration (e.g. fingerprint authentication or face authentication) is changed, or a SIM card inserted into the mobile device 100 is changed, that information may be transmitted to the server SV through the network NT to be stored in the database.

A situation where the mobile devices 100 possessed by multiple users sense among themselves will be described with reference to FIG. 6. Here, FIG. 6 is a diagram showing a situation where device-characteristic information is transmitted and received between the mobile devices.

Figure 6:
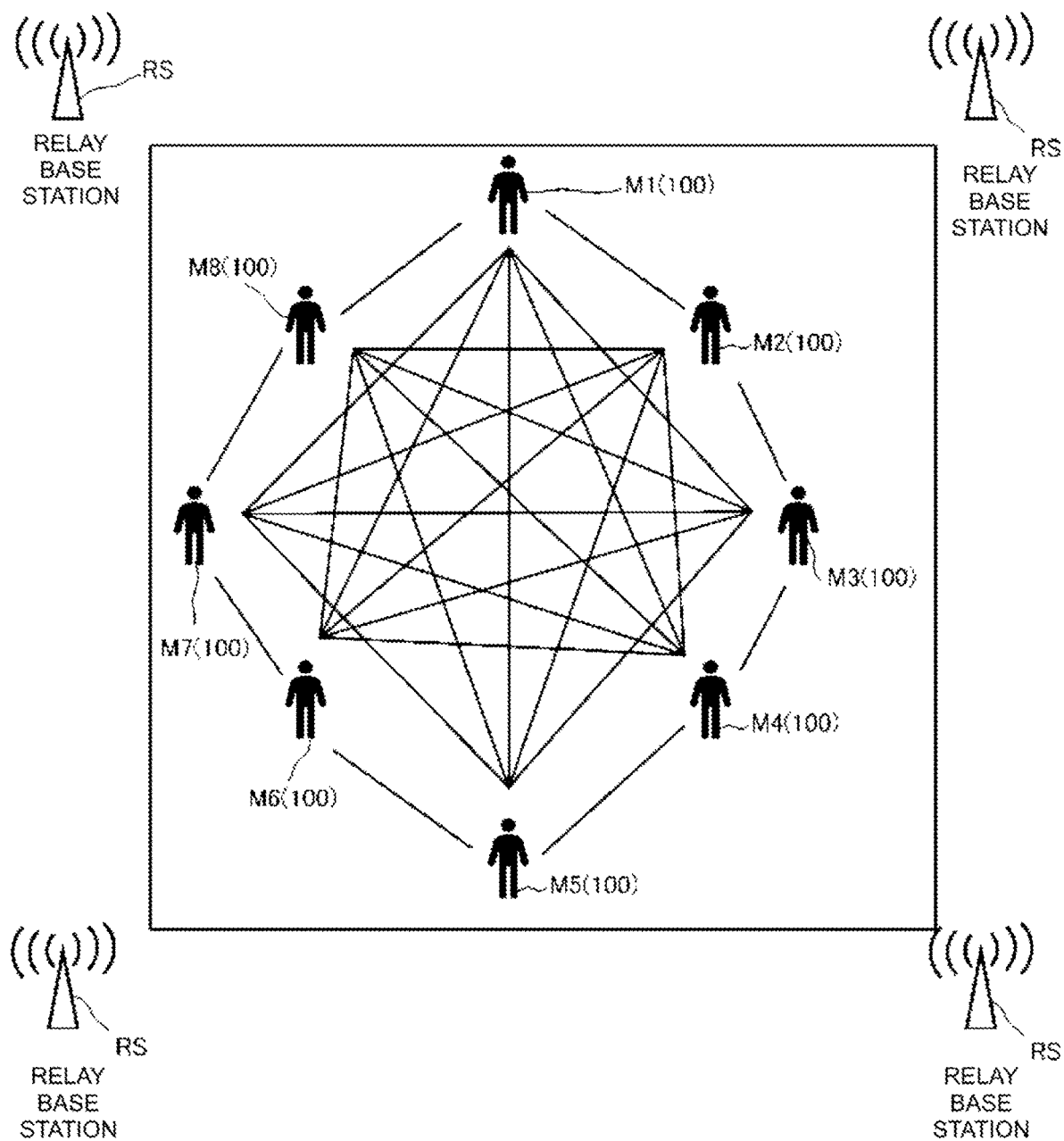
FIG. 6 is a diagram showing a situation where device-characteristic information is transmitted and received between the mobile devices.

As shown in FIG. 6, the mobile devices 100 possessed by the users M1 to M8 sense among themselves and the respective device-characteristic information is transmitted and received. Thus, the behavior confirmation information is generated as described above. Then, by transmitting the behavior confirmation information thus generated to a nearby relay base station RS in real time, the server SV acquires and manages the behavior confirmation information through the network NT.

Next, with reference to FIG. 7, a situation where the server SV maps users on a virtual map 123 based on the received information collected by the server SV as described above will be described. Here, FIG. 7 is a diagram showing a situation where users are mapped to a virtual map based on data stored in the database on the server.

For example, in order to have knowledge of the positional relationship of the users when an incident occurs at a certain time, the server SV reads the received information collected from the large-capacity storage device, generates a virtual map 123, and performs mapping by arranging nearby users 125 to 133 surrounding the victim 124 on the generated virtual map 123. That is, when the device-characteristic information for a mobile device of the victim 124 and time are input, information on the other mobile devices 100 that are associated with the mobile device 100 of the victim 124 at the time of the input is extracted by referring to the data field for the corresponding device ID in the large-capacity storage device. Since this information includes the relative positional relationship with the mobile device 100 belonging to the victim 124 and the distance therefrom, it is possible to indicate the positional relationship among the users 124 to 133 including the victim by performing mapping processing, which arranges the users 125 to 133 surrounding the victim 124 on the virtual map 123 based on the above information.

Figure 7:
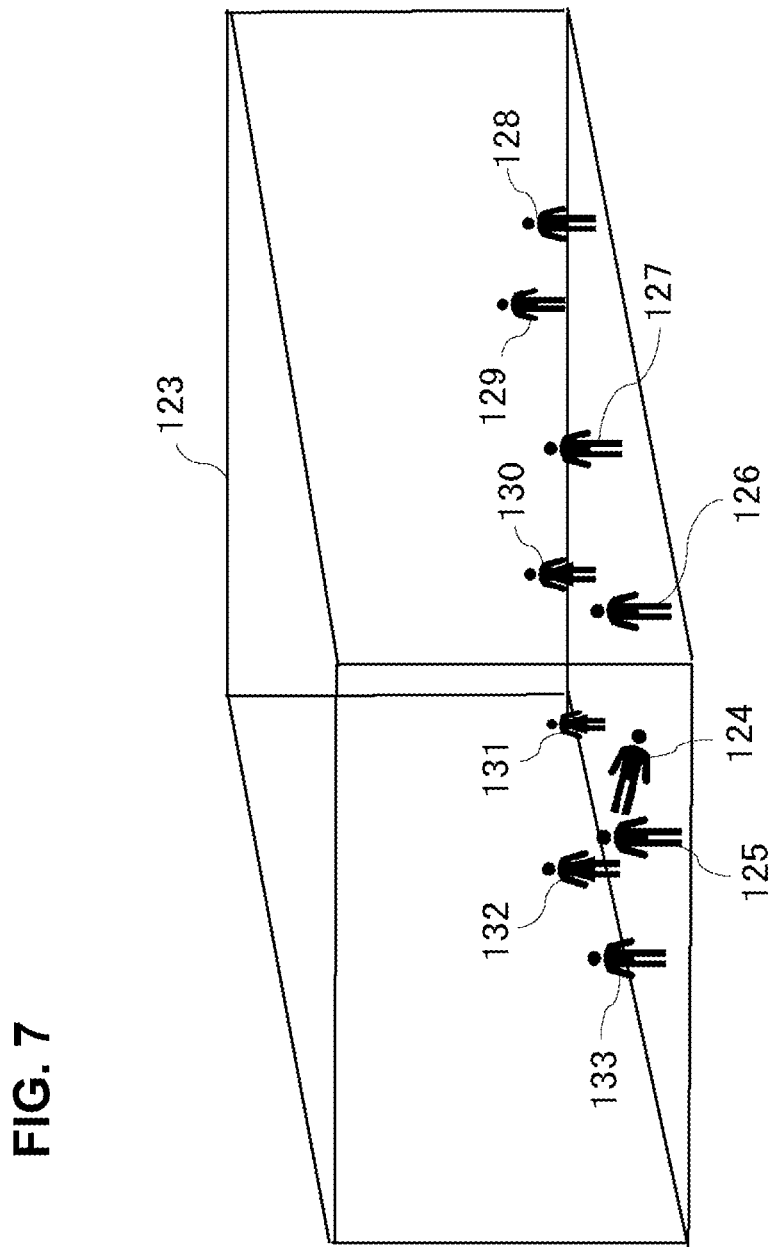
FIG. 7 is a diagram showing a situation where users are mapped to a virtual map based on data stored in the database on the server.

For example, as shown in FIG. 7, when the victim 124 is harmed in a crime scene, the user 125 is located at the closest position, and the user 126, the user 132 and the user 133 are in the vicinity. Such users can therefore be identified as a criminal or a person of interest. Since users 127 to 131 were also located nearby on the same virtual map 123, they can be identified as witnesses, for example. In this way, it is possible to utilize for the investigation of cases conducted by the authorities, for example. Here, for example, when DNA information can be instantly authenticated, the accuracy can be further improved by identifying the person.

In the present embodiment, an example in which the virtual mapping is performed on a particular time is shown but the virtual mapping is performed once in a time period (e.g. every second) and the virtual mapping can be output in such a way that it can be recognized in time series. As a result, it is possible to have knowledge of the behavior of each user more accurately.

Next, with reference to FIG. 8, an example of a technique for identifying the position of the criminal CR using the result of virtual mapping will be described. Here, FIG. 8 is a diagram illustrating a situation where the position of a criminal CR is changing in time series.

Figure 8:
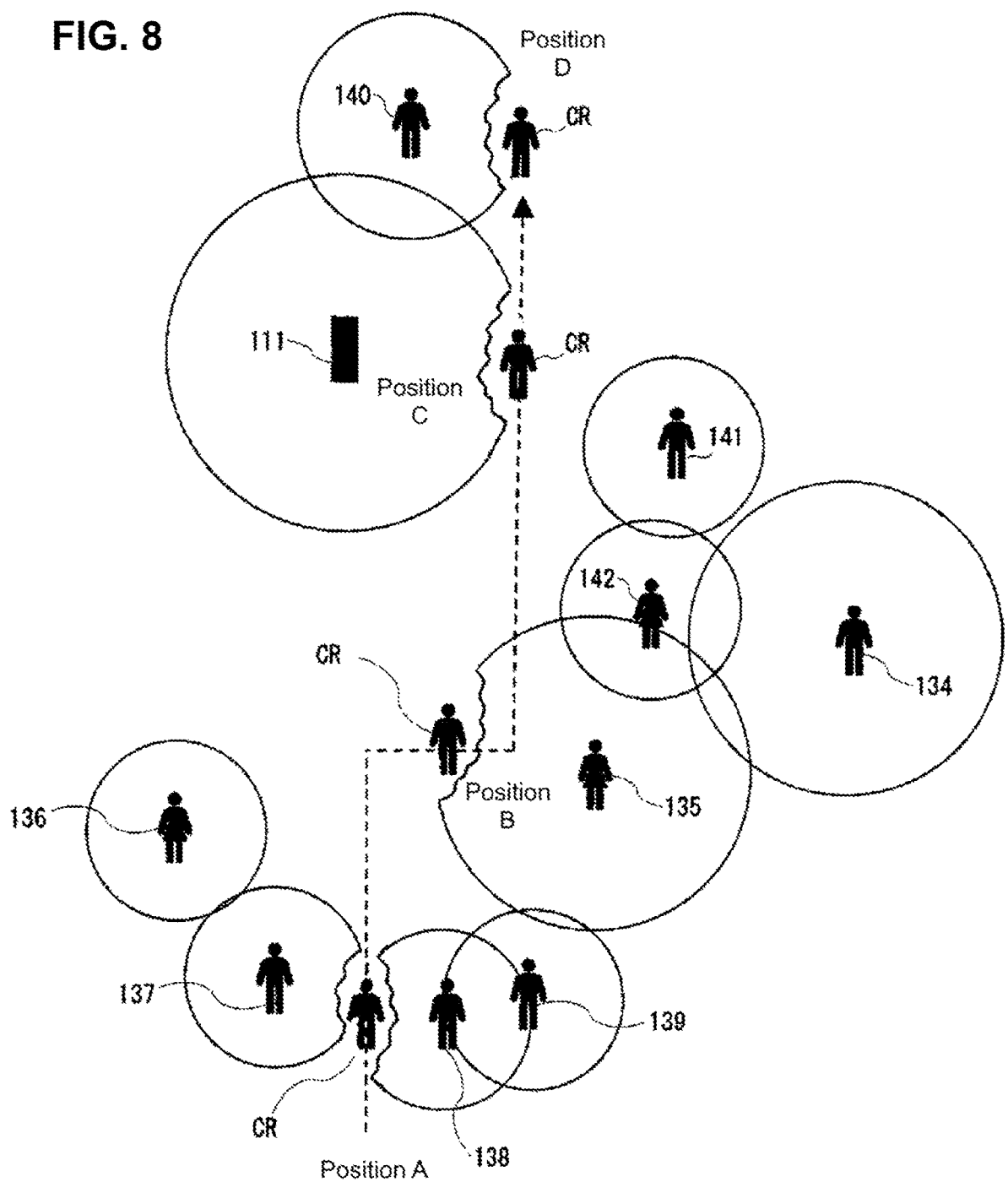
FIG. 8 is a diagram illustrating a situation where the position of a criminal is changing in time series.

FIG. 8 shows a situation where the criminal CR is running away from Position A to Position D via Position B and Position C. If the criminal CR possesses a mobile device 100, the position of the criminal can be identified as described above, but if the criminal CR does not possess a mobile device 100, it is difficult to identify the position of the criminal CR. In such a case, in the present embodiment, the reflected wave produced by the radio waves emitted from the mobile device 100 of interest being reflected on the criminal CR is received by the mobile device 100 of interest to acquire the object information (e.g. the presence or absence of an object based on the reflection information from the object, the relative positional relationship with the object, the size, shape or movement of the object) by analyzing the reflection information such as the intensity and distortion of the received reflected waves. The result is transmitted to the server SV. In the example shown in FIG. 8, there are users 134 to 142, who are nearby users located near the criminal CR. Since the present embodiment is configured so that the near field communication can be carried out with the other mobile device 100, information on the relative positional relationship and the distance with the other mobile device 100 is also acquired. A wireless station 111 is installed on a predetermined position. The near field communication can also be carried out from such a wireless station. The beacon information (e.g. absolute positional information) thus obtained can be transmitted to the server SV. Therefore, the received information from the mobile devices 100 possessed by the users 134 to 142 is also transmitted to the server SV as appropriate, and the beacon information is also transmitted from the wireless station 111 to the server SV as appropriate.

The server SV can create a virtual map in time series once in a predetermined time period by executing the above-mentioned virtual mapping that is based on the received information and the beacon information stored in the large-capacity storage device and that includes the object information. As a result, it is possible to have knowledge of the position of the object (criminal CR). That is, in the example shown in FIG. 8, the situation where the criminal CR had run away from Position A and had arrived on Position D via Position B and Position C.

When the crime is committed in a planned manner, the criminal CR tends to avoid possessing a mobile device 100 of which the position may be identified. The radio waves emitted from the mobile devices 100 of the nearby users 134 to 42 are however reflected on the criminal CR to be received by the mobile device 100 of interest with distortion. Therefore, the object (criminal CR) can be identified by analyzing the distortion and the intensity of the reflected waves. As a result, the position of the criminal CR can be identified, which is useful for tracking the criminal CR.

If a large amount of data can be transmitted at high speed, information can be passed on to one after another and the human behavior management in society can be managed on a large scale and accurately.

In addition, it is possible to manage the behavior of users with higher accuracy by generating a large number of virtual maps as described above to create teacher data and analyzing the teacher data and inputting a user ID and time.

Since the present embodiment is configured as described above, the position of the criminal can be easily identified. Therefore, it is possible to expect a lower number of false accusations or unsolved cases and prevent crimes. As a result, it will be possible to create a world where ordinary people can live with peace of mind. When the mobile device 100 is under the control of a company, for example, the company can have knowledge of the position of an employee, which is useful for preventing troubles.

The behavior management system described above can be used for preventing crimes in the present embodiment but can also be used for the early detection of, for example, a person infected with an infectious disease such as COVID-19 or a person who was in close contact with such an infected person.

The positional relationship between the mobile device of the user and the mobile device possessed by other user is known and the absolute position (current position) is known by the near field communication with the wireless station by using the near field communication in the present embodiment but as to the absolute position (current position), the mobile device may have a GPS so as to be able to identify the position of the user in the server SV by transmitting the positional information identified by the GPS to the server SV.

In the present embodiment, a portable communication device such as a smartphone is described as an example of a mobile device but the mobile device is not limited to this and any mobile device having the above-described functions can be used. For example, the above-described functions may be provided in: accessories such as necklaces, pendants, earrings or bracelets; personal ornaments such as glasses, watches, belts or key holders; cards such as identification cards, driver's licenses, government-issued ID cards, cash cards, credit cards, electronic money cards or name tags; equipment accessories, such as helmets or belts, worn by people engaged in factories or warehouses; or keys such as those for automobiles (e.g. smart keys, keyless keys). The above devices may enable near field communication among themselves or with a portable communication device, and may be configured to store information obtained by the near field communication and enable communication with the server SV through the network NT. The above-described devices such as accessories may be configured to enable pairing with a portable communication device with near field communication so that the above-described devices are in charge of near field communication with mobile devices of another person, and thus the portable communication device carries out the communication with the server SV.

In the present embodiment, the device is described as a device that can be used to, for example, search for a criminal, but it can also be used for other purposes.

Specifically, the mobile device may be used in many ways, for example, in daily life in the user's free time during commuting to work or school. Examples of such ways include collecting information and playing games using a mobile device such as a smartphone. For example, there are situations where mobiles devices are not allowed to use in consideration of influence to medical devices in cases where medical staffs such as doctors and nurses work in hospitals and situations where mobiles devices are not allowed to be brought in with the person for preventing information leakage in secure areas inside company facilities.

Under such circumstances, for example, there are many occupations or situations in which choosing a person to deal with cannot be done. Examples of such industries include service staff in stores, medical staff, and desk clerk in public offices. In such occupations, there are situations where a person needs to deal with so-called complainers who make ridiculous complaints. In such occupations, a person generally wears a name tag. It is advantageous if the name tag can function as a mobile device in the above-described embodiment. Hereinafter, an example of the detailed configuration will be described with reference to FIGS. 9 to 12. The description for functions or configurations similar to that of the above-described embodiment will be omitted.

Figure 9:
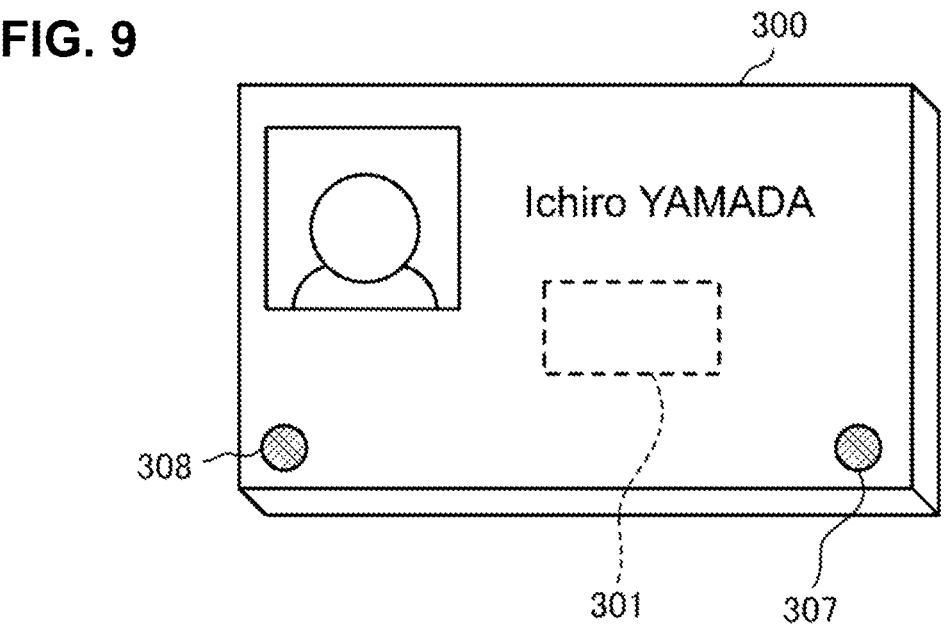
FIG. 9 is a diagram illustrating a configuration of a name tag as an example of a mobile device according to the present embodiments.

FIG. 9 is a diagram illustrating a configuration of a name tag as an example of a mobile device according to the present embodiments.

As shown in FIG. 9, the name tag 300 has a cash card size, for example, and is made of resin. The name of the person who puts on the name tag 300 is written on the slightly left side of the upper center of the front surface of the name tag 300 and the facial photograph of the person is on the upper left portion. The name tag 300 has a built-in control unit 301. The control unit 301 may be driven by, for example, a built-in battery, or may be activated or charged by applying radio waves from a reader/writer device.

A hole is formed in the lower right corner of the name tag 300, and a lens of an imaging unit 307 is provided to face the hole. Another hole is formed in the lower left corner of the name tag 300, and a microphone of a voice acquisition unit 308 is provided to face the hole.

The imaging unit 307 captures images of a video or a still image continuously or at predetermined time intervals and performs A/D conversion of the images so as to output the images to the control unit 301. The voice acquisition unit 308 collects voice continuously or at predetermined time intervals and performs A/D conversion of the voice so as to output the voice to the control unit 301. The imaging unit 307 and the voice acquisition unit 308 may cooperate to acquire voice/image data, or the voice data and the image data may be acquired separately.

Figure 10:
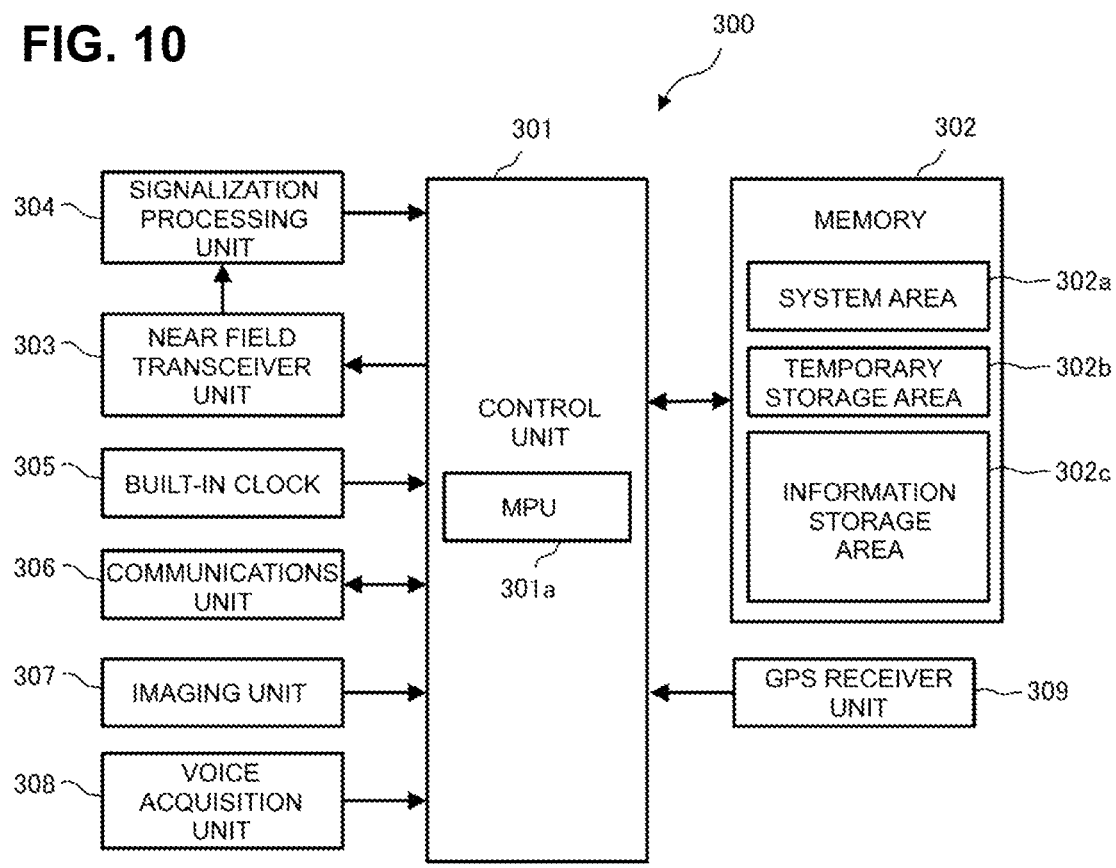
FIG. 10 is a functional block diagram for explaining a function of a hardware configuration for performing the function according to the present embodiment provided inside the name tag.

FIG. 10 is a functional block diagram for explaining a function of a hardware configuration for performing the function according to the present embodiment provided inside the name tag 300. Description for the same configuration as the above-described mobile device 100 shown in FIG. 2 will be omitted.

As shown in FIG. 10, the name tag 300 includes: a control unit 301 including an MPU 301a; a memory 302 including a system area 302a, a temporary storage area 302b, and an information storage area 302c; a near field transceiver unit 303; a signal processing unit 304; a built-in clock 305; a communications unit 306; an imaging unit 307; a voice acquisition unit 308; and a GPS receiver unit 309.

For example, the imaging unit 307 produces image data by photoelectrically converting the input light with a charge coupled device (CCD) image sensor or a complementary metal oxide semiconductor (CMOS) image sensor and performing A/D conversion so as to output the image data to the control unit 301.

The voice acquisition unit 308 electrically converts the input voice with a device such as PZT and generates the voice data by performing A/D conversion so as to output the voice data to the control unit 301.

The GPS receiver unit 309 identifies the current position based on the time information that is transmitted from a GPS satellite and outputs the information to the control unit 301.

Since the name tag 300 has the above-described configuration, it can function as the mobile device. The above configuration can be adopted not only for the name tag 300 but also for any device that can be used as the mobile device.

Next, face-to-face situation processing executed in the name tag 300 having the above-described configuration will be described with reference to FIG. 11. The name tag 300 also executes the reception processing described above with reference to FIG. 4.

First, the MPU 301a of the control unit 301 acquires image data of an image captured by the imaging unit 307 (step S201). The image data to be acquired may be a still image or a video having a predetermined length.

Next, the MPU 301a determines whether or not a person is included in the image by analyzing the acquired image data (step S203). That is, the MPU 301a analyzes whether or not the user who is putting on the name tag 300 is facing another person using the acquired image data with artificial intelligence (AI). The teacher data for image recognition may be stored in the memory 302, or the image data may be uploaded to the server SV via the network NT so as to be analyzed by the server SV and to be fed back the result.

When it is determined that the acquired image includes a person (step S203; Yes), the MPU 301a executes person determination processing (step S205). Specifically, the MPU 301a determines whether or not the person included in the image is a particular person such as those in a list of complainers, or a person registered by the authorities as a person who needs special attention or a wanted criminal. Specifically, the acquired image data including a person is analyzed with AI and the determination is made based on the result. The teacher data for image recognition may be stored in the memory 302, or the image data may be uploaded to the server SV via the network NT so as to be analyzed by the server SV and to be fed back the result.

Next, the MPU 301a determines whether or not the person included in the acquired image is a particular person as a result of executing the person determination processing (step S207). When it is determined that the person is a particular person (step S207; Yes), the MPU 301a generates information indicating that the acquired image includes a particular person and stores the information together with behavior confirmation information, which will be described later, in the temporary storage area 302b in the memory 302 (step S209). Meanwhile, if it is not determined that the person is a particular person (step S207; No), the MPU 301a executes the processing in step S211 is executed without executing the processing in step S209. If it is not determined in step S203 that the acquired image includes a person (step S203; No), the MPU 301a executes the processing in step S211 without executing the processes in steps S205 to S209.

The MPU 301a executes voice determination processing (step S211). Specifically, the MPU 301a analyzes by AI whether or not a particular pattern of voice has been input based on the voice recognition data (teacher data) stored in the information storage area 302c in the memory 302.

Next, the MPU 301a determines whether or not the input voice has a particular pattern as a result of the voice determination processing (step S213). The voice of a particular pattern may be voice patterns of one or a predetermined number of times of apology words (e.g. "I'm sorry" or "We apologize"), or may be voice patterns of related situations in cases of malicious marketing or deceiving others for the purpose of harming others, for example, "You will get high interest rates.", "You will earn money 100%.", "Please invest in this.", "Lend me some money.", "Please help me", "Please stop!", "It hurts!", "It's painful!", "I don't like it anymore.", or "I'll pay you back until XX."

When it is determined that the input voice is a voice of a particular pattern (step S213; Yes), the MPU 301a generates information indicating that the input voice includes a voice of a particular pattern and stores the information in the temporary storage area 302b in the memory 302 for storing together with confirmation information, which will be described later (step S215). Meanwhile, when it is not determined that the input voice is a voice of a particular pattern (step S213; No), the MPU 301a executes the processing in step S217 without executing the processing in step S215.

Thereafter, the MPU 301a acquires the current time from the built-in clock 305 and the positional information indicating the current position from the GPS receiver unit 309 (step S217). Thereafter, the MPU 301a generates and encrypts the information indicating that the acquired image includes a particular person, the information indicating that the input voice generated in step S209 includes a voice having a particular pattern, and the behavior confirmation information including the acquired current time and current positional information (step S219). Then, the MPU 301a stores the information in the behavior confirmation information storage area in the information storage area 302c in the memory 302 (step S221) and ends the face-to-face situation processing. The behavior confirmation information is transmitted to the server SV via the network NT at an appropriate timing but may be promptly transmitted to the server SV when the behavior confirmation information includes the information indicating that the acquired image includes a particular person and the information indicating that the input voice includes a voice having a particular pattern. At least one of the acquired image and voice may be encrypted together with the behavior confirmation information so as to be stored in the behavior confirmation information storage area in the information storage area 302c and to be transmitted to the server SV.

Next, an example of the use of the name tag 300 having the above-described configuration will be described with reference to FIGS. 12 to 13.

Figure 12:
FIG. 12 is a diagram showing a situation of interaction between a doctor and a complainer in a hospital.

FIG. 12 shows interactions in a hospital between a doctor DR and a patient who is a complainer (hereinafter referred to as "complainer ENM"). The doctor DR puts on the name tag 300 described above.

The complainer ENM who had received a medical treatment comes to the hospital complaining that the illness does not get well, approaching the doctor DR who was in charge of the medical treatment of the complainer ENM, and demands unreasonable demands saying "My illness does not get well! What can you do? Give me back my money!" Meanwhile, the doctor DR replies to the complainer ENM, "I'm sorry." but the problem does not seem to be settled so the doctor DR is thinking of asking someone for help. In such a case, for example, when the voice of the above-described particular pattern is included in the utterings of the complainer ENM or the doctor DR, the control unit 300 built in the name tag 300 executes the above-described processing. Then, assuming that an abnormal situation has occurred, the behavior confirmation information is transmitted to the server SV via the network NT.

Figure 13:
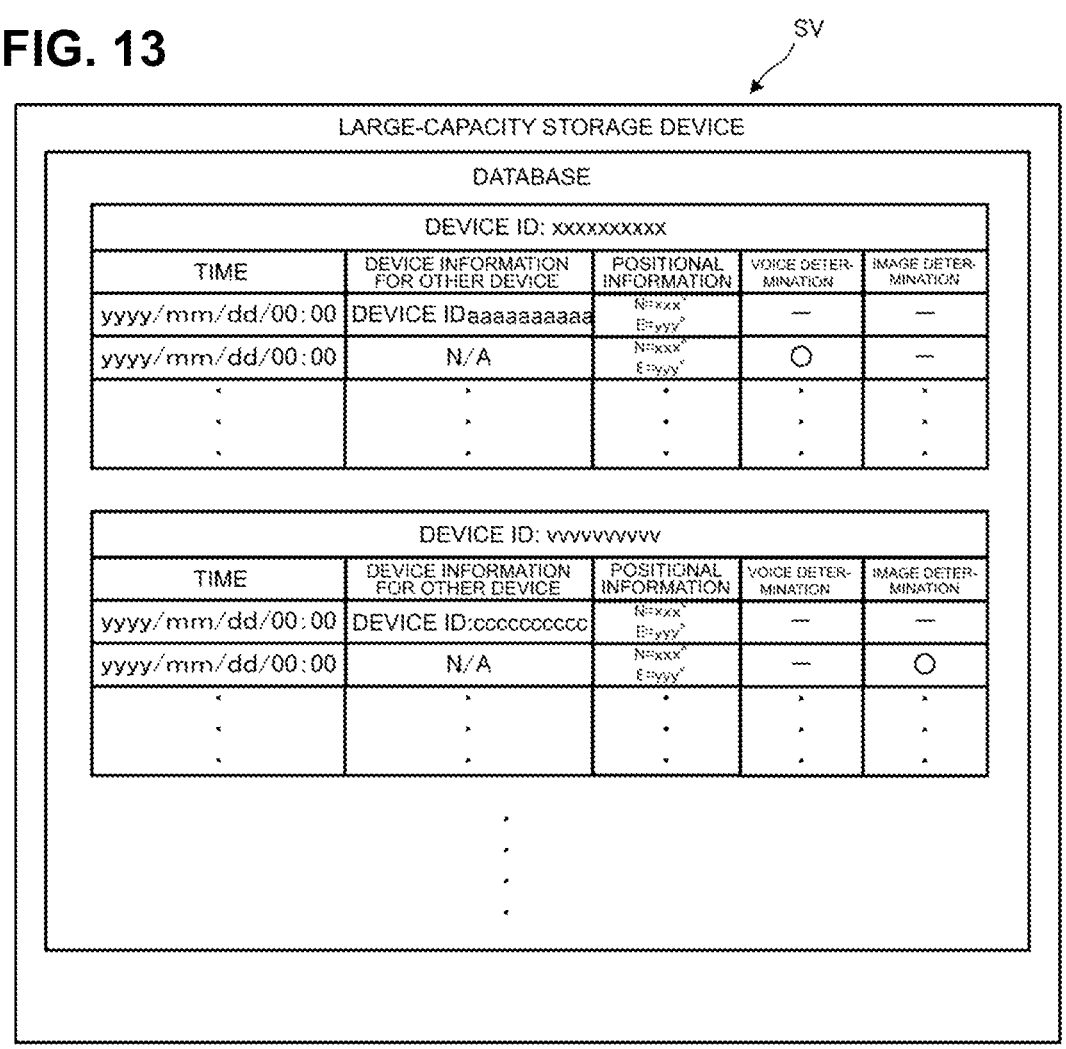
FIG. 13 is a diagram for explaining another example of a configuration of a database formed in a large-capacity storage device in a server.
Figure 14:
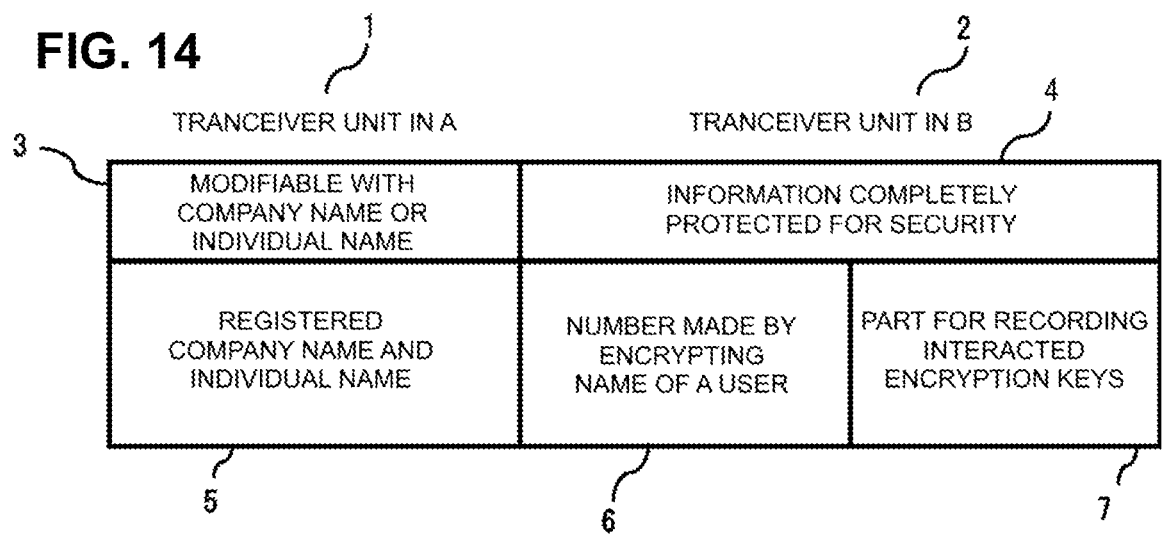
FIG. 14 is a diagram for explaining a configuration of a transceiver unit in A and a transceiver unit in B in the mobile device.
Figure 15:
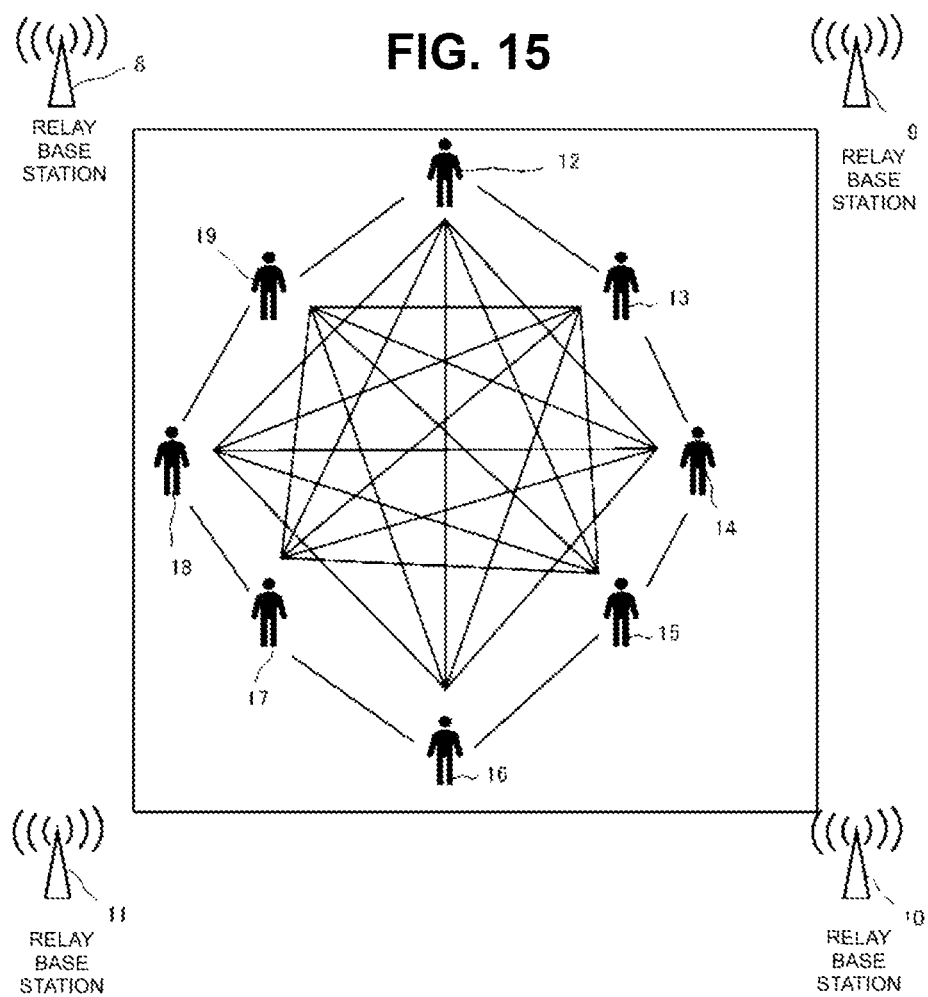
FIG. 15 is a diagram showing a situation where mobile devices held by people interact and ciphers are transmitted and received.
Figure 16:
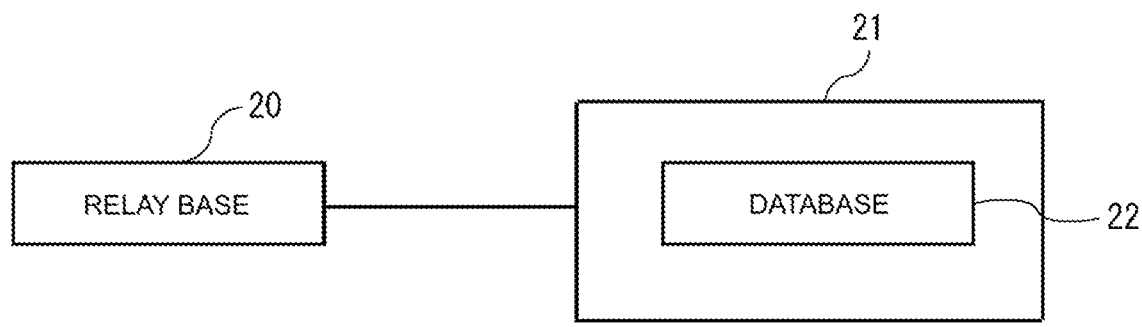
FIG. 16 is a diagram showing a flow of recorded information.
Figure 17:
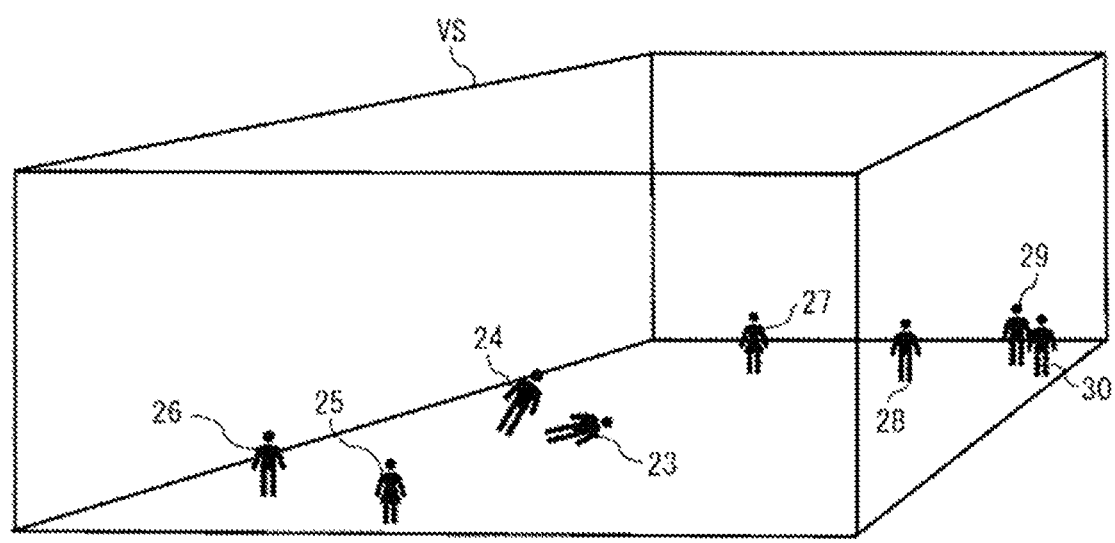
FIG. 17 is a diagram showing human behavior in a 3D virtual space.

The large-capacity storage device in the server SV has a configuration as shown in FIG. 13. That is, in the large-capacity storage device shown in FIG. 13, the above-described time information and device information for other device are stored in the data field produced for each device ID, but as to the positional information, information indicating the above-described relative positional relationship with the mobile device of interest or positional information indicating the current position acquired by the GPS is stored, and information indicating that a particular person is included in the acquired image (image determination information) and information indicating whether or not the voice includes a voice having a particular pattern is included (voice determination information) are stored in association with the device ID. When a flag is recorded in the voice determination information or the image determination information, it is possible to determine that an abnormal situation has occurred in the person who possesses the device corresponding to the device ID. Therefore, it is possible to deal with the situation promptly by, for example, transmitting information indicating that an abnormal situation had occurred to a device associated with the device ID corresponding to the device possessed by the person concerned at the time of the occurrence of the abnormal situation (e.g. a device possessed by a security guard for the hospital to which the doctor DR belongs, in the example shown in FIG. 12).

Thus, in the present embodiment, it is possible to solve problems according to the situation by having a function of promptly notifying the related personnel who have a certain relationship with the parties concerned in cases where an abnormal situation that requires urgent response occurs. For example, by using the same mobile device as the mobile device that is usually used, such a mobile device can be used as a measure against stalking.

In a mobile device, such as a smartphone, capable of making a voice call, it is possible to identify the other party even if, for example, the call was designated to not notify the caller, by, for example, frequency analyzing the received voice in the voice acquisition unit 308 in the present embodiment and storing the result in association with the personal information of the other party in the memory 302. Alternatively, there may be cases where damages caused by bank transfer scams against the elderly can be prevented by displaying "Unknown person" or "Suspicious person" on the display when the other party cannot be identified.

The mobile device may not include a storage means including a received information storage area for storing the received information, or a radio wave processing means for converting the received radio waves to a signal.

That is, the application program can cause a mobile device including a communication means capable of performing wireless communication on radio waves and a voice acquisition unit capable of acquiring a voice from an external source, execution of: voice determination processing for determining whether or not a particular pattern of voice has been input based on the voice acquired by the voice acquisition unit; particular voice pattern information generation processing for generating, when it is determined that a particular patter of voice is input in the voice determination processing, particular voice patter information indicating the input thereof; and information transmission processing for transmitting the particular voice pattern information to the management server by the communication means.

A behavior management device may be configured to manage behavior of the user of the mobile device by using information that is transmitted from the mobile device on which such an application program is installed and that is stored in the management server.

The application program can cause a mobile device including a communication means capable of performing wireless communication on radio waves and an imaging unit capable of capturing an image, execution of: person determination processing for determining whether or not a particular person is included in the image based on the acquired image from the imaging unit; particular person information generation processing for generating, when it is determined in the person determination processing that the particular person is included in the acquired image, particular person information indicating inclusion of the particular person; information transmission processing of transmitting the particular person information to the management server by the communication means.

A behavior management device may be configured to manage behavior of the user of the mobile device by using information that is transmitted from the mobile device on which such an application program is installed and that is stored in the management server.

Second Embodiment

Next, another embodiment according to the present invention will be described. The purpose of use of the present invention is not limited to those indicated below and the present embodiment can also be used in combination with the above-described embodiment.

The embodiment of the invention described below relates to a system for carrying out risk management of accidents and incidents that people encounter by chance on a daily basis.

Cameras are installed on many places in the city and are used to track criminals of a crime, for example.

The user's history of use and current position can be confirmed on mobile devices such as mobile phones. In the future, it will be possible to send and receive large amounts of information using next-generation mobile communication systems (for example, 5G).

BLE is known as a near field communication technique for determining the distance using the intensity of radio waves. In such techniques, a distance determination device receives radio waves transmitted from a BLE tag included in a Bluetooth device at a location. Then, the distance to the Bluetooth device including the tag is determined (see Patent Documents A and B).

Patent Document A: JP 2019-15643 A

Patent Document B: JP 2007-112436 A

Identity of a person can be confirmed by checking whether or not the mobile device belongs to the person, generally using a SIM card. The mobile device does not operate unless it is used by the owner.

A lot of information is detected at once in crowded places in the city or on trains, and therefore information processing needs to be speeded up. Thus, the range of interaction is narrowed automatically.

It may be necessary to pay attention to privacy of the individuals in the present invention.

Personal identification numbers or passwords using letters or numbers may be insufficient for a mobile device. There are cases where the password is used by a third party, shared among friends, or stolen in some cases. Identity of a person can be carried out suitably if face recognition or fingerprints recognition can be used, or DNA recognition can be used instantly in the future.

It is unlikely that a person 10 meters away harms another person. The intensity of radio waves can be enhanced or weakened depending on the location. If there are many people, a suitable range of information is collected.

As the amount of data and the speed of data increase, information is passed onto one person to another. Then, management of people in the area can be carried out on a large scale.

In order to achieve this, a management system needs to be operated by both the public and private sectors.

Only limited personnel can disclose an encryption key under a permission of a public institution.

Based on the above description, the following may be noted.

People come into contact with strangers every day when they leave home in the morning. People come into contact with strangers every day while commuting on trains or cars. In the present invention, it is possible to know the victim and the perpetrator in the case of an accident or an incident, for example. By analyzing an encryption key with AI, human behavior can be expressed in detail in 3D virtually, and as shown in FIG. 12, the human positions can be known using a unit of seconds. For example, when a person with a mobile device (hereinafter referred to as a "person") collapsed, it can be known that a person 24 was the closest and persons 25 to 30 were around them.

In accordance with the present invention, a mobile device interacts with other nearby mobile devices on a daily basis and encryption keys of the other party is transmitted to a relay station to be managed there. Therefore, it is possible to identify an accomplice or the like using an encryption key that repeatedly interacts with each other.

For example, it is difficult to identify the criminal in the case of a thrill kill but if the criminal possesses a mobile device, the criminal can be identified if there are victims or witnesses. Mobile devices interact with many other mobile devices in a crowded train. Therefore, there is a function to measure the distance by using the intensity of radio waves. When there is a crime such as a molester, it is possible to express a person who was at the closest position in 3D virtually and whether there are any persons with past criminal record so as to search for the criminal.

In recent years, a mobile device is not limited to mobile phones. For example, if there is a device having functions shown in FIG. 9, it is possible to carry out the risk management of daily life and protect oneself when an employee of a company or the like experiences a privacy problem.

It is a big downfall when an employee is involved in a crime from the perspective of a company manager. This is much more serious when an employee is a perpetrator. The company may have to face a civil case in the case of an accident during work in addition to criminal charges. That is, there is a possibility of accidentally encountering an incident at any time. It can be said that everyone has a risk of such troubles unless everything is planned.

Even only the company name, affiliation, and telephone number of the employee can be input into the mobile device. The mobile device may be used as a strong proof when the person is accused of a false accusation during the above-described commuting.

Fraudulent groups are becoming sophisticated year by year. They are creating all kinds of means, such as the use of a name of a well-known bank and saying "We have an amount to refund to you", or impersonating an employee to get cash. Forgery of corporate business cards is easy. According to the present invention, the mobile device can be used as an identification card and the identity of the person can be transmitted to, for example, the mobile device of the other party.

The mobile device can further enhance human behavior information by using the next-generation mobile communication system, and when an incident occurs, it will be possible to express the situation in three dimensions in real time.

In condominiums where there are a large number of households, many people go in and out of the condominium. Not only the residents living in the condominium but also people belonging to different organizations, such as courier services, post offices and banks, come and go every day. Even though security is enhanced by installing automatic locks and security cameras and placing a superintendent, the criminals may go inside the condominium without pressing the PIN at the entrance door. This may be done by, for example, impersonating to be another occupation like a courier and waiting for residents to come out even if the entrance door is automatic locked. In other words, the criminals take advantage of the drawbacks of such an automatic lock. The door may also be opened in an average house when the criminals introduce themselves as a courier deliverer over the door. There are cases where people get involved in a crime. A mobile device may be configured to communicate for authentication at the entrance of a condominium and to communicate with the other party for proof of identity at the entrance of the door of an individual household. This can be treated in the same way for detached houses.

Based on the above, an example of the embodiment will be described below with reference to FIGS. 9 to 12.

The mobile device includes a transceiver unit shown in FIG. 9. The mobile device interacts with mobile devices within a certain range, belonging to persons 12 to 19 shown in FIG. 10 and transmits the obtained encryption key to relay bases 8 to 11. Then, as shown in FIG. 11, the encryption key is transmitted to a base 21 including a database 22 and managed there.

Figure 11:
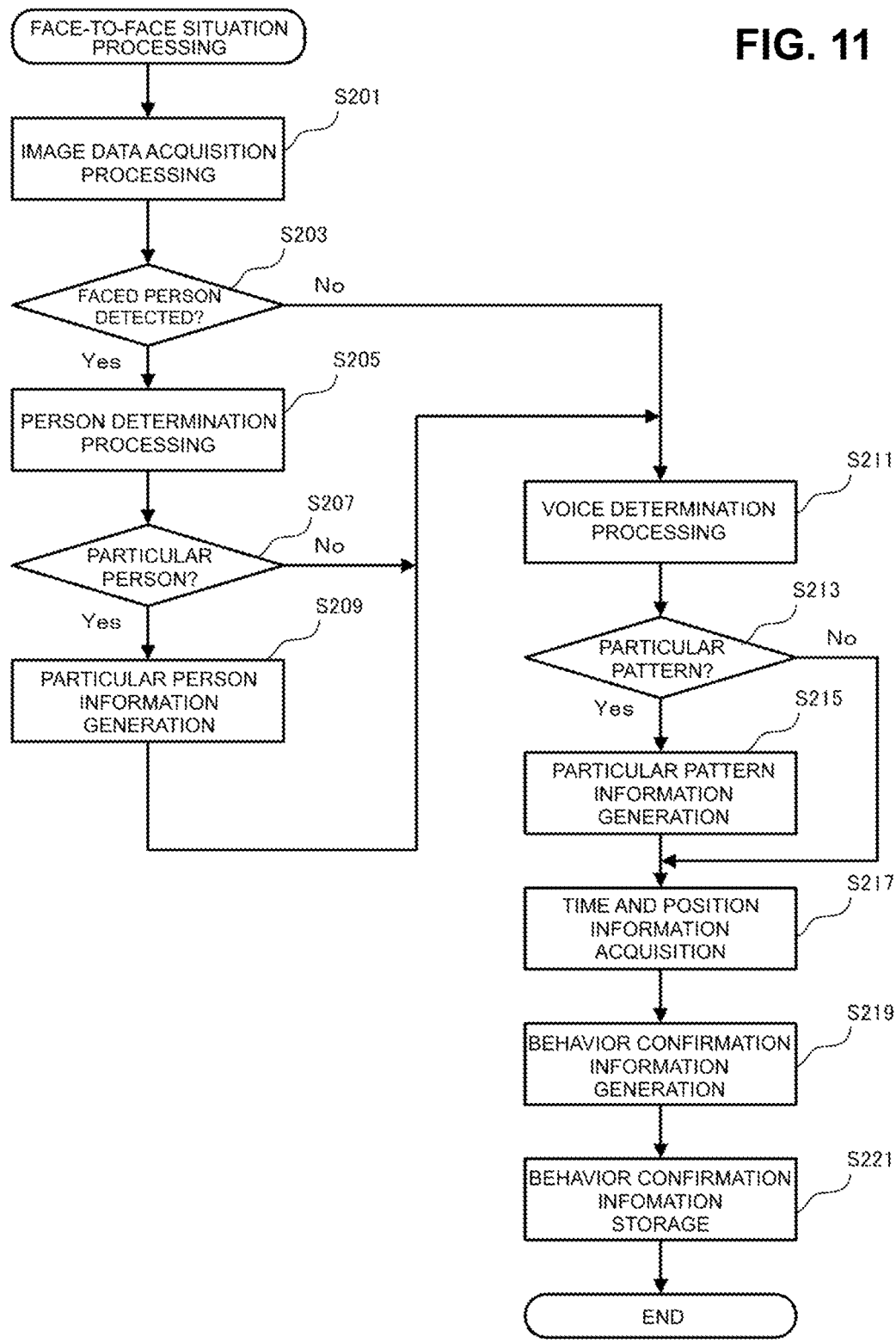
FIG. 11 is a flowchart for explaining face-to-face processing executed in a name tag, which serves as a mobile device on which the application program according to the present embodiments is installed.

The database 22 shown in FIG. 11 includes a system that can be used by certain people in the event of an incident or in indispensable cases.

According to the above configuration, it can be stated as follows.

The mobile devices respectively include transceiver units 1, 2 shown in FIG. 9. The mobile device interacts with other mobile devices possessed by other persons 12 to 19 and that are approaching while the mobile device is operating. The mobile devices have a function for having knowledge of the encrypted numbers, distances, and directions of the interacted mobile devices. The recorded data is transmitted from the relay bases 8 to 11 to the database 22 shown in FIG. 11 and stored therein.

By using encryption keys that interacted with a large number of mobile devices, human behavior can be virtually expressed in a unit of seconds, for example, as shown in FIG. 12 by AI or the like for measuring the direction, distance, and time.

The part of the transceiver unit 1 in FIG. 9 may include a user, a company name, and an address, and can be freely set by an individual so that one can inform the other party of his or her identity. For example, in the case of package delivery, it is possible to introduce one's identity to the other party, by informing that a package is being delivered by sending radio waves to a device in a room.

According to the embodiment described above, for example, the society will be improved to be difficult for criminals to escape, and as a result, we can expect a world where ordinary people can live with peace of mind. The number of false accusation and unsolved cases, which may happen even nowadays, can be reduced, making it easier to identify the criminal. In recent years, a mobile device is not limited to a mobile phone. As long as a device has functions and configurations according to the present embodiment, more peaceful daily life can be expected as the range of behavior management is widened. When an employee such as a company employee encounters troubles related to privacy, the device can protect the owner.

The user can be reconfirmed by biometric authentication such as face authentication and fingerprint authentication at the time when the mobile device is started up but if DNA can be authenticated instantly, it can be expected that the location of the criminal can be identified instantly.

For example, people use public transportation such as trains every day when they commute to the office, and walk on the sidewalk to interact with strangers. By using the management system according to the present embodiment, it is possible to quickly identify the victim or the perpetrator in the event of an accident or incident. By generating a virtual map in time series based on the received information stored in the server SV, it is possible to have knowledge of the human behavior in detail in three dimensions.

In the present embodiment, mobile devices that are close to each other daily sense each other, and device information for the other party is transmitted to the server SV via a relay base station, and therefore it can be expected to identify an accomplice who is in contact with the criminal.

For example, in street slasher cases, it is difficult to identify the criminal when the criminal escapes from a crime scene, but if the criminal possesses a mobile device, it is possible to identify the criminal easily if there is a victim or a witness. For example, many mobile devices detect each other in a crowded train and the relative position of the other party can be identified by the intensity of radio waves. Therefore, it is easier to identify who was the closest in cases such as when a woman was molested. Thus, it can be expected that the criminal can be easily found by monitoring whether or not there are any criminals with criminal record or previous convictions among the criminal data that the authorities have. On the contrary, it is possible to monitor the behavior of a particular person every day by identifying a dangerous person or the like as a person requiring attention on the server SV side and issuing an alert.

For example, it is a big downfall when an employee is involved in a crime from the perspective of a company manager. This is much more serious when an employee is a perpetrator. If the incident happened while working, the company may have to face a civil case in addition to criminal charges. Anyone has a risk of being involved in a trouble anywhere and anytime. It can be said that everyone has a risk of such troubles unless everything is planned.

For example, fraudulent groups are becoming more sophisticated year by year. Various ways are created to steal money by impersonating an employee of a famous company. For example, they say "We have an amount to refund to you" by using the name of a famous company. It is easy to forge a company business card. According to the present embodiment, a mobile device possessed by a person can be used as a substitute for identification, and it may be possible to guarantee the identity by transmitting the identity of the person to a mobile device or the like of the other party.

For example, a next-generation mobile communication system such as 5G is used so that the mobile device can improve the accuracy of behavior information of a person. Then, it is possible to carry out more precise behavior management when an incident or the like had occurred.

For example, the number of people going in and out increases considerably when the number of households increases in condominiums. Not only the residents living in the condominium but also people such as courier deliverer, postal workers or bank employees come and go every day. Security has been enhanced by installing automatic locks and security cameras and by resident superintendents but criminals can go inside the condominium without unlocking the lock by pretending to be of another occupation such as a courier deliverer, or waiting for a resident to come out from the inside when the entrance door is an automatic locked door. There are cases where people get involved in crimes since the door may also be opened in an average house when the criminals introduce themselves as a courier deliverer over the door. It is expected that the entrance of the condominium or a door on an average house is used as a means of issuing identification to the other party by using the mobile device according to the present embodiment.

As described above, the present embodiment relates to an application program characterized in that the application program causes a mobile device 100 comprising: a memory 102 including a characteristic information storage area 1000 for storing device-characteristic information and a received information storage area 2000 for storing the received information; a near field transceiver unit 103 capable of carrying out near field communication with another mobile device 100 on radio waves; and a signalization processing unit 104 for converting the received radio waves into signals, execution of: transmission and reception processing for transmitting and receiving, by the near field transceiver unit 103, device characteristic information to and from another mobile device 100 that has approached within a predetermined range of distance; device information storage processing for storing, in a received information storage area 2000, device information (e.g. device-characteristic information set for each device) received from another mobile device 100 in the transmission and reception processing together with time information; radio wave intensity detection processing for detecting at least an intensity of radio waves based on radio wave signals obtained by converting, by the signalization processing unit 104, the radio waves that are transmitted from the another mobile device 100 into signals; positional relationship storage processing for identifying a relative positional relationship with the another mobile device 100 based on the intensity of the radio waves detected by the radio wave intensity detection processing and for storing the relative positional relationship in a received information storage area 2000; and information transmission processing for transmitting, to a server SV via a network NT, the device information about the another mobile device 100, the time information, and the relative positional relationship information stored in the received information storage area 2000. As a result, it is possible to accurately manage behavior of others surrounding the person by collecting information about nearby mobile devices using the near field communication technology included in the mobile device of interest.

The application program according to the present embodiment further causes the mobile device 100 execution of: object information storage processing for detecting an object (criminal CR) based on the radio wave signals (e.g. reflection information such as the intensity and waveform of at least the reflected wave) obtained by converting the received reflected waves into signals by the signalization processing unit 104 when receiving reflected waves of the radio waves output from the mobile device 100 of interest, and for storing, in the received information storage area 2000, the reflection information together with the time information by identifying the relative positional relationship with the object (criminal CR). The application program according to the present embodiment further causes the mobile device 100 execution of: processing for transmitting reflection information (e.g. information about an object (criminal CR)) of radio waves from the mobile device 100 of interest stored in the received information storage area 2000, time information, and the relative positional relationship information to the server SV via the network NT in the information transmission processing. As a result, it is possible to accurately manage behavior of a person who does not possess a mobile device, for example.

The present embodiment also relates to an application program characterized in that the application program causes a mobile device 100 comprising: a memory 102 including a characteristic information storage area 1000 for storing device-characteristic information and a received information storage area 2000 for storing the received information; a near field transceiver unit 103 capable of carrying out near field communication with another mobile device 100 on radio waves; and a signalization processing unit 104 for converting the received radio waves into signals, execution of: device information storage processing for storing, in a received information storage area 2000, device information (e.g. device-characteristic information set for each device) received from another mobile device 100 together with time information; radio wave intensity detection processing for detecting at least an intensity of radio waves based on radio wave signals obtained by converting, by the signalization processing unit 104, the radio waves that are transmitted from the another mobile device 100 into signals; positional relationship storage processing for identifying a relative positional relationship with the another mobile device 100 based on the intensity of radio waves detected by the radio wave intensity detection processing and for storing the relative positional relationship in a received information storage area 2000; object information storage processing for detecting an object (criminal CR) based on the radio wave signals (e.g. reflection information such as the intensity and waveform of at least the reflected wave) obtained by converting the received reflected waves into signals by the signalization processing unit 104 when receiving reflected waves of the radio waves output from the mobile device 100 of interest, and for storing, in the received information storage area 2000, the reflection information together with the time information by identifying the relative positional relationship with the object (criminal CR); and information transmission processing for transmitting, to a server SV via a network NT, the device information about the another mobile device 100, the time information, and the relative positional relationship information stored in the received information storage area 2000, and the reflection information of radio waves (e.g. information about the object (criminal CR)), the time information, and the relative positional relationship information from the mobile device 100 of interest. As a result, it is possible to accurately manage behavior of others surrounding the person by collecting information about nearby mobile devices using the near field communication technology included in the mobile device of interest. It is also possible to accurately manage behavior of a person who does not possess a mobile device, for example.

According to the present embodiment, the application program also causes a name tag 300 further including a voice acquisition unit 308 capable of acquiring a voice from an external source, execution of: voice determination processing for determining whether or not a particular pattern of voice has been input based on a voice acquired by the voice acquisition unit 308; particular voice pattern information generation processing for generating, when it is determined in the voice determination processing that a particular pattern of voice has been input, particular voice pattern information indicating the input thereof; and suitable processing as necessary in the information transmission processing, so as to contribute to the prevention of crimes against the user since the particular voice pattern information can be transmitted to the server SV via the network NT.

According to the present embodiment, the application program also causes a name tag 300 further including an imaging unit 307 capable of capturing an image, execution of: person determination processing for determining whether or not a particular person is included in an image based on the image acquired by the imaging unit 307; particular person information generation processing for generating, if it is determined that a particular person is included in the image in the person determination processing, particular person information indicating inclusion of the particular person; and suitable processing as necessary in the information transmission processing, so as to contribute to the prevention of crimes against the user since the particular person information can be transmitted to the server SV via the network NT.

According to the present embodiment, the server SV further includes: a time information input means for accepting input of time information; and a mapping means for mapping the mobile device 100 on a virtual map based on device-characteristic information corresponding to the time information for which input was accepted by the time information input means, object information, and relative positional relationship information corresponding to the device-characteristic information and the object information. As a result, it is possible to contribute to solve various problems by enabling behavior management for users possessing a mobile device as well as users not possessing a mobile device.

According to the present embodiment, since the server SV can execute the mapping in time series, it is possible to further contribute to solve various problems.

According to the present embodiment, the server SV further includes: a time information input means for accepting input of time information; and a mapping means for mapping the user on a virtual map based on device-characteristic information corresponding to the time information for which input was accepted by the time information input means, and relative positional relationship information corresponding to the device-characteristic information read from a database in the server SV and that corresponds to the device-characteristic information. As a result, it is possible to contribute to solve various problems by enabling behavior management for the users.

According to the present embodiment, the server SV further includes: a time information input means for accepting input of time information; and a mapping means for mapping the mobile device 100 on a virtual map based on device-characteristic information corresponding to the time information for which input was accepted by the time information input means, object information, and relative positional relationship information corresponding to the device-characteristic information and the object information; and a particular information transmission means for transmitting, when the particular voice pattern information is included in the information received from the name tag 300, particular information to a mobile device corresponding to the device-characteristic information associated in advance with the device-characteristic information corresponding to the name tag 300. As a result, it is possible to contribute to the prevention of crimes by carrying out suitable processing as necessary since persons possessing mobile devices linked to a mobile device of which the owner is facing an abnormal situation can be informed of information indicating the situation, for example.

According to the present embodiment, the server SV further includes: a time information input means for accepting input of time information; and a mapping means for mapping the mobile device 100 on a virtual map based on device-characteristic information corresponding to the time information for which input was accepted by the time information input means, object information, and relative positional relationship information corresponding to the device-characteristic information and the object information; and a particular information transmission means for transmitting, when the particular person information is included in the information received from the name tag 300, particular information to a mobile device corresponding to the device-characteristic information associated in advance with the device-characteristic information corresponding to the name tag 300. As a result, it is possible to contribute to the prevention of crimes by carrying out suitable processing as necessary since persons possessing mobile devices linked to a mobile device of which the owner is facing an abnormal situation can be informed of information indicating the situation, for example.

The operations and advantageous effects described in the embodiments of the present invention are merely a result of listing the most suitable operations and advantageous effects resulting from the present invention. The operations and advantageous effects according to the present invention should not be limited to what has been described in the embodiments of the present invention.

In the present embodiment, the near field communication is described as an example of wireless communication but carrier waves such as communication radio waves for mobile phones or broadcasting radio waves may be used. Bluetooth is described as an example of the near field communication but any means capable of transmitting and receiving information over a short distance can be used. For example, any means that conveys information by a light ray such as infrared rays can be used.

REFERENCE SIGNS LIST

1, 2: transceiver unit
3: data type
4: protected portion of data (black box)
5, 6, 7: data recording portion
8, 9, 10, 11: relay base station
12, 13, 14, 15, 16, 17, 18, 19: person possessing a mobile device
20: relay base station
21: base for managing information (server)
22: database
23~30: persons expressed virtually
VS: virtual space
100: mobile device
101: control unit
101a: MPU
102: memory
102c: information storage area
103: near field transceiver unit
104: signalization processing unit
105: built-in clock
106: communications unit
300: name tag (mobile device)
301: control unit
301a: MPU
302: memory
302c: information storage area
303: near field transceiver unit
304: signalization processing unit
305: built-in clock
306: communications unit
307: imaging unit
308: voice acquisition unit
309: GPS receiver unit
1000: characteristic information storage area
1002: device-characteristic information storage area
2000: received information storage area
2002: behavior confirmation information storage area
123: virtual map
124~142: users
CR: criminal
RS: relay base station
NT: network
SV: server

The invention claimed is:

1. A non-transitory storage medium storing an application program characterized in that the application program causes a mobile device comprising:
a storage means including a received information storage area for storing received information transmitted from another mobile device;
a wireless communication means capable of communicating wirelessly via radio waves;
a radio wave processing means for performing signalization processing of the radio waves that is received, and
an imaging unit capable of capturing an image,
to execute:
reception processing for receiving, by the wireless communication means, the radio waves transmitted from the another mobile device that has approached within a predetermined distance;
device information storage processing for storing, in the received information storage area, device information about the another mobile device received in the reception processing together with time information;
radio wave intensity detection processing for detecting at least an intensity of the radio waves based on radio wave signals wherein the radio wave signals are obtained by signalizing, by the radio wave processing means, the radio waves transmitted from the another mobile device;
positional relationship storage processing for identifying a relative positional relationship with the another mobile device based on the intensity of the radio waves detected by the radio wave intensity detection processing and for storing the relative positional relationship in the received information storage area;
information transmission processing for transmitting, to a management server, the device information about the another mobile device, the time information, and relative positional relationship information that is related to the relative positional relationship stored in the received information storage area;
person determination processing for determining, based on the image acquired by the imaging unit, whether or not a particular person is included in the image; and
particular person information generation processing for generating, if it is determined that a particular person is included in the image acquired in the person determination processing, particular person information indicating inclusion of the particular person, and wherein the particular person information can be transmitted to the management server during the information transmission processing.

2. The non-transitory storage medium according to claim 1, characterized in that the mobile device further comprises a voice acquisition unit capable of acquiring a voice from an external source, and the application program causes execution of:
voice determination processing for determining, based on the voice acquired by the voice acquisition unit, whether or not a specific pattern of voice has been input; and
particular voice pattern information generation processing for generating particular voice pattern information indicating that the specific pattern of voice has been input if it is determined that the specific pattern of voice has been input in the voice determination processing, and wherein the particular voice pattern information can be transmitted to the management server during the information transmission processing.

3. A non-transitory storage medium storing an application program characterized in that the application program causes a mobile device comprising:
a storage means including a received information storage area for storing received information transmitted from an executing mobile device;
a wireless communication means capable of communicating wirelessly via radio waves;
a radio wave processing means for performing signalization processing of the radio waves that is received, and
an imaging unit capable of capturing an image,
to execute:
reception processing for receiving, by the wireless communication means, the radio waves transmitted from the executing the executing mobile device and reflected by an object that has approached within a predetermined distance;
object information storage processing for storing, in the received information storage area, reflection information from the object received in the reception processing together with time information;
reflected wave intensity detection processing for detecting at least an intensity of the reflected radio waves based on radio wave signals wherein the radio wave signals are obtained by converting, by the radio wave processing means, the reflected radio waves transmitted from the executing mobile device into signals;
positional relationship storage processing for identifying a relative positional relationship with the object based on the intensity of the reflected radio waves detected by the reflected wave intensity detection processing and storing the relative positional relationship in the received information storage area;
information transmission processing for transmitting, to a management server, the reflection information, the time information, and relative positional relationship information that is related to the relative positional relationship about the object stored in the received information storage area; and
person determination processing for determining, based on the image acquired by the imaging unit, whether or not a particular person is included in the image; and
particular person information generation processing for generating, if it is determined that a particular person is included in the image acquired in the person determination processing, particular person information indicating inclusion of the particular person, and wherein the particular person information can be transmitted to the management server during the information transmission processing.

4. The non-transitory storage medium according to claim 3, characterized in that the mobile device further comprises a voice acquisition unit capable of acquiring a voice from an external source, and the application program causes execution of:
voice determination processing for determining, based on the voice acquired by the voice acquisition unit, whether or not a specific pattern of voice has been input; and
particular voice pattern information generation processing for generating particular voice pattern information indicating that the specific pattern of voice has been input if it is determined that the specific pattern of voice has been input in the voice determination processing, and wherein the particular voice pattern information can be transmitted to the management server during the information transmission processing.

5. A behavior management device for managing behavior of a user of a mobile device by using information that is transmitted from the mobile device on which an application program is installed and that is stored in a management server, wherein:
the mobile device includes:
a memory including a received information storage area for storing received information;
a wireless communication means capable of communicating wirelessly via radio waves; and
a signalization processing unit to signalize the radio waves transmitted from the another mobile device wherein this process is defined as a signalizing processing,
the mobile device is configured
to receive the radio waves transmitted from the another mobile device that has approached within a predetermined distance wherein this process is defined as a reception processing;

to store, in the received information storage area, device information about the another mobile device received in the reception processing together with time information;

to detect at least an intensity of the radio waves based on radio wave signals wherein the radio wave signals are obtained by signalizing, by the signalization processing unit, the radio waves transmitted from the another mobile device, wherein this process is defined as a radio wave intensity detection processing;

to identify a relative positional relationship with the another mobile device based on the intensity of the radio waves detected by the radio wave intensity detection processing and to store the relative positional relationship in the received information storage area; and to transmit, to a management server, the device information about the another mobile device, the time information, and relative positional relationship information that is related to the relative positional relationship stored in the received information storage area, and the behavior management device comprises:

a time information input means for accepting input of time information; and a mapping means for reading, from the management server, device information corresponding to the time information for which input was accepted by the time information input means and the relative positional relationship information corresponding to the device information, and mapping the user on a virtual map based on the device information and the relative positional relationship information thus read.

6. The behavior management device according to claim 5, characterized in that the mapping means can carry out the mapping in time series.

7. A behavior management device for managing behavior of a user of a mobile device by using information that is transmitted from the mobile device on which an application program is installed and that is stored in a management server, wherein:

the mobile device includes:

a memory including a received information storage area for storing received information transmitted from the mobile device operated by the user wherein the mobile device is also defined as an executing mobile device;

a wireless communication means capable of communicating wirelessly via radio waves; and a signalization processing unit to signalize the radio waves transmitted from the executing mobile device wherein this process is defined as a signalizing processing, the mobile device is configured to to receive, by the wireless communication means, the radio waves transmitted from the executing mobile device and reflected by an object that has approached within a predetermined distance wherein this process is defined as a reception processing;

to store, in the received information storage area, reflection information from the object received in the reception processing together with time information;

to detect at least an intensity of the reflected radio waves based on radio wave signals wherein the radio wave signals are obtained by converting, by the signalization processing unit, the reflected radio waves transmitted from the executing mobile device into signals wherein this process is defined as a reflected wave intensity detection processing;

to identify a relative positional relationship with the object based on the intensity of the reflected radio waves detected by the reflected wave intensity detection processing and to store the relative positional relationship in the received information storage area; and to transmit, to a management server, the reflection information, the time information, and relative positional relationship information that is related to the relative positional relationship about the object stored in the received information storage area, and the behavior management device comprises:

a time information input means for accepting input of time information; and a mapping means for reading, from the management server, device information corresponding to the time information for which input was accepted by the time information input means, reflection information from the object, and the relative positional relationship information corresponding to the reflection information, and to map the user and the object on a virtual map based on the reflection information and the relative positional relationship information thus read.

8. The behavior management device according to claim 7, characterized in that the mapping means can carry out the mapping in time series.

9. A behavior management device for managing behavior of a user of a mobile device by using information that is transmitted from the mobile device on which an application program is installed and that is stored in a management server, wherein:

the mobile device includes:

a memory including a received information storage area for storing received information transmitted from another mobile device;

a wireless communication means capable of communicating wirelessly via radio waves;

a signalization processing unit to signalize the radio waves transmitted from the another mobile device into radio wave signals wherein this process is defined as a signalizing processing; and a voice acquisition unit capable of acquiring a voice from an external source, the application program causes the mobile device to execute:

to receive the radio waves transmitted from the another mobile device that has approached within a predetermined distance wherein this process is defined as a reception processing;

to store, in the received information storage area, device information about the another mobile device received in the reception processing together with time information wherein this process is defined as a device information storage processing;

to detect at least an intensity of the radio waves based on radio wave signals wherein the radio wave signals are obtained by signalizing, by the signalization processing unit, the radio waves transmitted from the another mobile device wherein this process is defined as a radio wave intensity detection processing;

to identify a relative positional relationship with the another mobile device based on the intensity of the radio waves detected by the radio wave intensity detection processing and to store the relative positional relationship in the received information storage area wherein this process is defined as a positional relationship storage processing;

to transmit, to a management server, the device information about the another mobile device, the time information, and relative positional relationship information that is related to the relative positional relationship stored in the received information storage area, wherein this process is defined as an information transmission processing;

voice determination processing for determining, based on the voice acquired by the voice acquisition unit, whether or not a specific pattern of voice has been input; and particular voice pattern information generation processing for generating particular voice pattern information indicating that the specific pattern of voice has been input if it is determined that the specific pattern of voice has been input in the voice determination processing, and wherein the particular voice pattern information can be transmitted to the management server during the information transmission processing, and the behavior management device comprises:
  a time information input means for accepting input of the time information;
  a mapping means for reading, from the management server, device information corresponding to the time information for which input was accepted by the time information input means and the relative positional relationship information corresponding to the device information, and mapping the user on a virtual map based on the device information and the relative positional relationship information thus read; and
  a particular information transmission means for transmitting, when the particular voice pattern information is included in information received from the mobile device, particular information to the mobile device corresponding to the device information associated in advance with the device information corresponding to the mobile device.

10. The behavior management device according to claim 9, characterized in that the mapping means can carry out the mapping in time series.

11. A behavior management device for managing behavior of a user of a mobile device by using information that is transmitted from the mobile device on which an application program is installed and that is stored in a management server, wherein:
  the mobile device includes:
    a memory including a received information storage area for storing received information transmitted from another mobile device;
    a wireless communication means capable of communicating wirelessly via radio waves;
    a signalization processing unit to signalize the radio waves transmitted from the another mobile device wherein this process is defined as a signalizing processing;
    a voice acquisition unit capable of acquiring a voice from an external source; and
    an imaging unit capable of capturing an image,
  the application program causes the mobile device to execute:
    to receive the radio waves transmitted from the another mobile device that has approached within a predetermined distance wherein this process is defined as a reception processing;
    to store, in the received information storage area, device information about the another mobile device received in the reception processing together with time information, wherein this process is defined as a device information storage processing;
    to detect at least an intensity of the radio waves based on radio wave signals wherein the radio wave signals are obtained by signalizing, by the signalization processing unit, the radio waves transmitted from the another mobile device, wherein this process is defined as a radio wave intensity detection processing;
    to identify a relative positional relationship with the another mobile device based on the intensity of the radio waves detected by the radio wave intensity detection processing and to store the relative positional relationship in the received information storage area;
    to transmit, to a management server, the device information about the another mobile device, the time information, and relative positional relationship information that is related to the relative positional relationship stored in the received information storage area, wherein this process is defined as an information transmission processing:
    voice determination processing for determining, based on the voice acquired by the voice acquisition unit, whether or not a specific pattern of voice has been input;
    particular voice pattern information generation processing for generating particular voice pattern information indicating that the specific pattern of voice has been input if it is determined that the specific pattern of voice has been input in the voice determination processing, and wherein the particular voice pattern information can be transmitted to the management server during the information transmission processing;
    person determination processing for determining, based on the image acquired by the imaging unit, whether or not a particular person is included in the image; and
    particular person information generation processing for generating, if it is determined that a particular person is included in the image acquired in the person determination processing, particular person information indicating inclusion of the particular person, and wherein the particular person information can be transmitted to the management server during the information transmission processing, and
  the behavior management device comprises:
    a time information input means for accepting input of the time information;
    a mapping means for reading, from the management server, the device information corresponding to the time information for which input was accepted by the time information input means and the relative positional relationship information corresponding to the device information, and mapping the user on a virtual map based on the device information and the relative positional relationship information thus read; and a particular information transmission means for transmitting, when the particular person information is included in the information received from the mobile device, particular information to the mobile device corresponding to the device information associated in advance with the device information corresponding to the mobile device.

12. The behavior management device according to claim 11, characterized in that the mapping means can carry out the mapping in time series.

* * * * *